US011909154B1

United States Patent
Richards et al.

(10) Patent No.: US 11,909,154 B1
(45) Date of Patent: Feb. 20, 2024

(54) ENDCAP FOR ESTABLISHING ELECTRICAL BONDING CONNECTION

(71) Applicant: CHATSWORTH PRODUCTS, INC., Simi Valley, CA (US)

(72) Inventors: David Michael Richards, Arden, NC (US); Kenneth Matthew Michaels, Vinton, VA (US); Steven Jay Gibble, Cedar Park, TX (US); Jared Keith Davis, Leander, TX (US)

(73) Assignee: Chatsworth Products, Inc., Simi Valley, CA (US)

( * ) Notice: Subject to any disclaimer, the term of this patent is extended or adjusted under 35 U.S.C. 154(b) by 0 days.

(21) Appl. No.: 17/688,832

(22) Filed: Mar. 7, 2022

Related U.S. Application Data

(60) Provisional application No. 63/213,448, filed on Jun. 22, 2021, provisional application No. 63/174,945, (Continued)

(51) Int. Cl.
*H01R 4/48* (2006.01)
*H01R 4/30* (2006.01)
(Continued)

(52) U.S. Cl.
CPC ............ *H01R 4/48* (2013.01); *H01R 4/308* (2013.01); *H01R 4/34* (2013.01); *H01R 11/09* (2013.01);
(Continued)

(58) Field of Classification Search
CPC . H01R 4/48; H01R 4/308; H01R 4/34; H01R 11/09; H01R 4/64; H01R 11/12; H02G 3/0608

See application file for complete search history.

(56) References Cited

U.S. PATENT DOCUMENTS

| 824,544 A | 6/1906 | Hossege |
| 1,880,081 A | 9/1932 | Frederickson |

(Continued)

FOREIGN PATENT DOCUMENTS

| CA | 1337647 C | 11/1995 |
| CA | 2137879 | 3/1999 |

(Continued)

OTHER PUBLICATIONS

"International Preliminary Report on Patentability" of the International Search Authority (ISA/US) in Chatsworth Products, Inc., International Patent Application Serial No. PCT/US2016/064135, dated Jun. 19, 2018 (8 pages).

(Continued)

*Primary Examiner* — Briggitte R. Hammond
(74) *Attorney, Agent, or Firm* — Tillman Wright, PLLC; James D. Wright; David R. Higgins

(57) ABSTRACT

A bonding endcap for use in connection with a bracket assembly for establishing an equipotential plane in a cable runway includes a spring clip and a bonding lug. The spring clip is made from an electrically conductive material and has two side walls that extend forward from a rear wall. The bonding lug is made from an electrically conductive material and includes a contact portion and a side arm extending at each side of the contact portion. The spring clip is positionable within a channel of a cable runway rail. The contact portion of the bonding lug is receivable between the side walls of the spring clip to deflect the side walls and establish an electrical bonding connection from the cable runway rail, through the spring clip, and to the bonding lug.

20 Claims, 16 Drawing Sheets

Related U.S. Application Data filed on Apr. 14, 2021, provisional application No. 63/157,938, filed on Mar. 8, 2021.

(51) Int. Cl.
*H01R 4/34* (2006.01)
*H02G 3/06* (2006.01)
*H01R 11/09* (2006.01)
*H01R 11/12* (2006.01)
*H01R 4/64* (2006.01)

(52) U.S. Cl.
CPC ............ *H02G 3/0608* (2013.01); *H01R 4/64* (2013.01); *H01R 11/12* (2013.01)

(56) References Cited

U.S. PATENT DOCUMENTS

| | | |
|---|---|---|
| 2,247,282 A | 6/1941 | Webb |
| 2,316,166 A | 4/1943 | Huguelet |
| 2,390,752 A | 12/1945 | Tinnerman |
| 2,406,415 A | 8/1946 | Tinnerman |
| 2,426,799 A | 9/1947 | Tinnerman |
| 2,430,555 A | 11/1947 | Burke |
| 2,459,953 A | 1/1949 | Mills |
| 2,495,037 A | 1/1950 | Tinnerman |
| 2,616,142 A | 11/1952 | Tinnerman |
| 2,695,046 A | 11/1954 | Tinnerman, III |
| 2,724,419 A | 11/1955 | Poupitch |
| 2,861,618 A | 11/1958 | Tinnerman |
| 2,875,804 A | 3/1959 | Flora |
| 2,972,002 A | 2/1961 | Wayman |
| 2,972,494 A | 2/1961 | Dominic |
| 3,019,409 A | 1/1962 | Sarafinas |
| 3,025,897 A | 3/1962 | Gieleghem |
| 3,035,624 A | 5/1962 | Jaworski |
| 3,042,351 A | 7/1962 | DuBois |
| 3,066,902 A | 12/1962 | Conil |
| 3,173,227 A | 3/1965 | Clark |
| 3,192,823 A | 7/1965 | Munse |
| 3,332,558 A | 7/1967 | Wilson |
| 3,379,090 A | 4/1968 | Parkin |
| 3,411,427 A | 11/1968 | Graham et al. |
| 3,414,663 A | 12/1968 | Glader |
| 3,486,158 A | 12/1969 | Soltysik et al. |
| 3,503,166 A | 3/1970 | Lipper et al. |
| 3,521,843 A | 7/1970 | Ogle |
| 3,540,758 A | 11/1970 | Torres |
| 3,551,876 A | 12/1970 | Walter |
| 3,585,333 A | 6/1971 | Valle et al. |
| 3,618,882 A | 11/1971 | Podedworny |
| 3,627,900 A | 12/1971 | Robinson |
| 3,672,706 A | 6/1972 | Chilcoat |
| 3,697,924 A | 10/1972 | Oliver |
| 3,710,199 A | 1/1973 | Cignoni |
| 3,780,209 A | 12/1973 | Schuplin |
| 3,780,351 A | 12/1973 | Salmon et al. |
| 3,789,567 A | 2/1974 | Rae et al. |
| 3,810,069 A | 5/1974 | Jaconette, Jr. |
| 3,861,774 A | 1/1975 | Willis |
| 3,864,009 A | 2/1975 | Wickenberg |
| 3,887,258 A | 6/1975 | Cunningham et al. |
| 3,919,457 A * | 11/1975 | Steiner .................. H01R 25/14 174/491 |
| 4,136,423 A | 1/1979 | Sterling |
| 4,375,933 A | 3/1983 | Hassler et al. |
| 4,379,537 A | 4/1983 | Perrault et al. |
| 4,429,440 A | 2/1984 | Laughlin et al. |
| 4,524,937 A | 6/1985 | Zizan |
| 4,575,295 A | 3/1986 | Rebentisch |
| 4,635,422 A | 1/1987 | Nowack et al. |
| 4,863,189 A | 9/1989 | Lindsay |
| 4,884,976 A | 12/1989 | Franks, Jr. |
| 4,887,949 A | 12/1989 | Dimmick et al. |
| 4,966,563 A | 10/1990 | Pierce et al. |
| 4,993,959 A | 2/1991 | Randolph |
| 5,006,074 A | 4/1991 | Franks, Jr. |
| 5,009,383 A | 4/1991 | Chapman |
| 5,022,873 A | 6/1991 | Kollmann |
| 5,024,251 A | 6/1991 | Chapman |
| 5,035,384 A | 7/1991 | Werthmann |
| 5,054,978 A | 10/1991 | Kowalski |
| 5,067,863 A | 11/1991 | Kowalski |
| 5,078,537 A | 1/1992 | Nomura |
| 5,078,613 A | 1/1992 | Salmon |
| 5,114,354 A | 5/1992 | Franks, Jr. |
| 5,149,026 A | 9/1992 | Allen |
| 5,199,836 A | 4/1993 | Gogarty |
| 5,271,586 A | 12/1993 | Schmidt |
| 5,320,565 A | 6/1994 | Polidori |
| D351,825 S | 10/1994 | Sachs |
| 5,384,937 A | 1/1995 | Simon |
| 5,391,084 A | 2/1995 | Krietzman |
| 5,491,892 A | 2/1996 | Fritz et al. |
| 5,531,410 A | 7/1996 | Simon |
| 5,580,014 A | 12/1996 | Rinderer |
| 5,609,467 A | 3/1997 | Lenhart et al. |
| 5,624,319 A | 4/1997 | Golczyk et al. |
| 5,640,482 A | 6/1997 | Barry et al. |
| 5,752,682 A | 5/1998 | Anderson |
| 5,791,498 A | 8/1998 | Mills |
| 5,806,811 A | 9/1998 | Viklund et al. |
| 5,816,866 A | 10/1998 | Langdon |
| 5,833,417 A | 11/1998 | Sargent et al. |
| 5,839,702 A | 11/1998 | Jette |
| 5,867,624 A | 2/1999 | Forrester et al. |
| D408,362 S | 4/1999 | Coll |
| 5,899,041 A | 5/1999 | Durin |
| 5,927,658 A | 7/1999 | Gerster |
| 5,953,870 A | 9/1999 | Jette |
| 5,989,052 A | 11/1999 | Fields et al. |
| 6,003,273 A | 12/1999 | Elsholz et al. |
| 6,019,323 A | 2/2000 | Jette |
| 6,019,446 A | 2/2000 | Laboch et al. |
| 6,023,024 A | 2/2000 | Stjerneby |
| 6,061,884 A | 5/2000 | Ohms et al. |
| 6,068,220 A | 5/2000 | Alrey |
| 6,086,300 A | 7/2000 | Frohlich |
| 6,105,218 A | 8/2000 | Reekie |
| 6,129,316 A | 10/2000 | Bauer |
| 6,138,961 A | 10/2000 | Zweig |
| 6,146,071 A | 11/2000 | Norkus et al. |
| 6,170,784 B1 | 1/2001 | MacDonald et al. |
| 6,174,177 B1 | 1/2001 | Auclair |
| 6,193,434 B1 | 2/2001 | Durin et al. |
| 6,215,069 B1 | 4/2001 | Martin et al. |
| 6,220,554 B1 | 4/2001 | Daoud |
| 6,227,502 B1 | 5/2001 | Derman |
| 6,239,364 B1 | 5/2001 | Nickel |
| 6,247,871 B1 | 6/2001 | Nickel et al. |
| 6,252,171 B1 | 6/2001 | Barr |
| 6,313,405 B1 | 11/2001 | Rinderer |
| 6,340,141 B1 | 1/2002 | Rinderer |
| 6,347,493 B1 | 2/2002 | Jette |
| 6,380,486 B1 | 4/2002 | Hemingway et al. |
| 6,401,939 B1 | 6/2002 | Durin |
| 6,427,400 B1 | 8/2002 | Greenblatt |
| 6,431,885 B1 | 8/2002 | Stroup |
| 6,449,912 B2 | 9/2002 | Jette |
| 6,457,924 B1 | 10/2002 | Wallace |
| 6,463,704 B1 | 10/2002 | Jette |
| 6,484,997 B1 | 11/2002 | Edwards et al. |
| 6,494,726 B1 | 12/2002 | Auclair |
| 6,570,092 B2 | 5/2003 | Quertelet |
| 6,590,154 B1 | 7/2003 | Badey et al. |
| 6,637,165 B2 | 10/2003 | Jette |
| 6,637,704 B2 | 10/2003 | Jette |
| 6,672,022 B2 | 1/2004 | Simmons |
| 6,677,530 B2 | 1/2004 | Blaha et al. |
| 6,715,619 B2 | 4/2004 | Kim et al. |
| 6,746,193 B1 | 6/2004 | Drake |
| 6,855,884 B2 | 2/2005 | Spagnoli et al. |
| 6,866,154 B2 | 3/2005 | Hartman et al. |
| 6,877,996 B1 | 4/2005 | Franks, Jr. |
| 6,976,292 B2 | 12/2005 | MacPherson et al. |

(56) References Cited

U.S. PATENT DOCUMENTS

| | | | |
|---|---|---|---|
| 7,093,725 | B2 | 8/2006 | Hartman et al. |
| 7,168,212 | B2 | 1/2007 | Jette |
| 7,226,260 | B2 | 6/2007 | Jackson, Jr. et al. |
| 7,293,666 | B2 | 11/2007 | Mattlin et al. |
| 7,373,759 | B1 | 5/2008 | Simmons |
| D577,977 | S | 10/2008 | Hernandez |
| 7,472,970 | B2 | 1/2009 | Bergesch et al. |
| 7,476,801 | B1 | 1/2009 | Davis et al. |
| 7,527,226 | B2 | 5/2009 | Kusuda et al. |
| 7,545,447 | B2 | 6/2009 | Matsumura et al. |
| 7,546,987 | B2 | 6/2009 | Sinkoff |
| 7,547,228 | B1 | 6/2009 | Schlarman |
| 7,789,606 | B2 | 9/2010 | Kosidlo, IV et al. |
| 7,819,676 | B1 * | 10/2010 | Cardoso ............... H02G 3/0431 439/115 |
| 7,952,057 | B2 | 5/2011 | Grelck |
| 7,954,776 | B2 | 6/2011 | Davis et al. |
| 8,014,171 | B2 | 9/2011 | Kelly et al. |
| 8,056,868 | B2 | 11/2011 | Vander Griend |
| 8,097,808 | B2 | 1/2012 | Quertelet et al. |
| 8,235,634 | B2 | 8/2012 | Arsen et al. |
| 8,263,863 | B2 | 9/2012 | Young |
| 8,424,814 | B2 | 4/2013 | Davis et al. |
| 8,459,918 | B2 | 6/2013 | Lin et al. |
| 8,684,319 | B2 * | 4/2014 | Brouwer ............... H02G 3/0443 248/58 |
| 8,746,466 | B2 | 6/2014 | Taylor |
| 8,757,560 | B2 | 6/2014 | Darnell |
| 8,844,888 | B1 | 9/2014 | Gretz |
| 8,864,504 | B1 | 10/2014 | Gretz |
| 8,879,881 | B2 | 11/2014 | Cote et al. |
| 9,112,341 | B2 | 8/2015 | Eshima et al. |
| 9,363,922 | B2 | 6/2016 | Larsen et al. |
| 9,373,943 | B1 | 6/2016 | Tannenbaum |
| 9,402,329 | B1 | 7/2016 | Chen et al. |
| 9,523,379 | B2 | 12/2016 | Stothers |
| 9,548,597 | B2 | 1/2017 | Vacca et al. |
| 9,556,976 | B1 | 1/2017 | Thompson et al. |
| 9,634,445 | B1 | 4/2017 | Brandon et al. |
| 9,755,414 | B2 | 9/2017 | Sparrowhawk et al. |
| 9,903,407 | B2 | 2/2018 | Hattori et al. |
| 10,187,995 | B2 | 1/2019 | Utz |
| 10,320,164 | B2 * | 6/2019 | Garcia ................. H02G 3/0456 |
| 10,337,550 | B2 | 7/2019 | Davis et al. |
| 10,547,145 | B2 | 1/2020 | Bowen et al. |
| 10,566,774 | B1 | 2/2020 | Krietzman et al. |
| 10,584,082 | B2 | 3/2020 | Utz et al. |
| D892,603 | S | 8/2020 | Axelsson |
| 10,797,475 | B1 | 10/2020 | Krietzman |
| 10,859,111 | B2 | 12/2020 | Davis |
| 11,209,039 | B2 | 12/2021 | Davis et al. |
| 11,629,742 | B2 | 4/2023 | Buczynski et al. |
| 2001/0022231 | A1 | 9/2001 | Dyer |
| 2002/0062969 | A1 | 5/2002 | Kumagai |
| 2002/0184843 | A1 | 12/2002 | Jette |
| 2003/0108385 | A1 | 6/2003 | Finco et al. |
| 2003/0156892 | A1 | 8/2003 | Finco et al. |
| 2004/0055232 | A1 | 3/2004 | Jette |
| 2004/0056157 | A1 | 3/2004 | Dufourg |
| 2004/0144898 | A1 | 7/2004 | Spagnoli |
| 2004/0154818 | A1 | 8/2004 | Franks, Jr. |
| 2004/0181916 | A1 | 9/2004 | Arduini |
| 2004/0245411 | A1 | 12/2004 | Phelan et al. |
| 2005/0063775 | A1 | 3/2005 | Boltz |
| 2005/0076602 | A1 | 4/2005 | Routhier |
| 2005/0220562 | A1 | 10/2005 | Blackaby |
| 2006/0038091 | A1 | 2/2006 | Winn et al. |
| 2006/0080933 | A1 | 4/2006 | Robicheau |
| 2006/0103270 | A1 | 5/2006 | Bergesch et al. |
| 2006/0175472 | A1 | 8/2006 | Boltz et al. |
| 2006/0269210 | A1 | 11/2006 | Waszak |
| 2007/0164181 | A1 | 7/2007 | Deciry et al. |
| 2008/0017760 | A1 | 1/2008 | Larsen et al. |
| 2008/0023212 | A1 | 1/2008 | Larsen et al. |
| 2008/0029301 | A1 | 2/2008 | Makwinski et al. |
| 2008/0062654 | A1 | 3/2008 | Mattlin et al. |
| 2008/0155915 | A1 | 7/2008 | Howe et al. |
| 2009/0047810 | A1 | 2/2009 | Seidel |
| 2009/0242270 | A1 | 10/2009 | Rumsey |
| 2010/0171004 | A1 | 7/2010 | Young |
| 2011/0020091 | A1 | 1/2011 | Larsen et al. |
| 2012/0110788 | A1 | 5/2012 | Chen |
| 2012/0134763 | A1 | 5/2012 | Lin et al. |
| 2012/0244729 | A1 | 9/2012 | Rivera et al. |
| 2013/0069501 | A1 | 3/2013 | Liu |
| 2014/0168842 | A1 | 6/2014 | Martinez et al. |
| 2014/0262412 | A1 | 9/2014 | Sparrowhawk et al. |
| 2014/0329420 | A1 | 11/2014 | Magno |
| 2015/0008295 | A1 | 1/2015 | Bae et al. |
| 2015/0050822 | A1 | 2/2015 | MacAllister |
| 2015/0105930 | A1 | 4/2015 | Sparrowhawk |
| 2015/0176630 | A1 | 6/2015 | Ros Blanco |
| 2016/0138261 | A1 | 5/2016 | Zhang et al. |
| 2017/0167523 | A1 | 6/2017 | Davis et al. |
| 2018/0076605 | A1 | 3/2018 | Garcia |
| 2019/0063483 | A1 | 2/2019 | Davis |
| 2020/0039033 | A1 | 2/2020 | Lai et al. |
| 2021/0079944 | A1 | 3/2021 | Davis |
| 2022/0099133 | A1 | 3/2022 | Davis |
| 2023/0147999 | A1 | 5/2023 | Goldstein |
| 2023/0193935 | A1 | 6/2023 | Wang |

FOREIGN PATENT DOCUMENTS

| | | |
|---|---|---|
| CN | 108431433 A | 8/2018 |
| CN | ZL201680073061.8 | 5/2021 |
| DE | 3105808 A1 | 9/1982 |
| EP | 0418167 A1 | 3/1989 |
| EP | 0444979 A1 | 1/1991 |
| EP | 0444979 B1 | 9/1991 |
| EP | 0298825 A1 | 4/1992 |
| EP | 0298825 B1 | 4/1992 |
| ES | 2007578 T3 | 1/1992 |
| ES | 2122829 A1 | 12/1998 |
| FR | 1402979 A | 6/1965 |
| FR | 2617341 A1 | 12/1988 |
| FR | 2794501 A1 | 12/2000 |
| GB | 981072 A | 1/1965 |
| GB | 2285343 A | 7/1995 |
| IT | MI94A02059 A1 | 10/1994 |
| JP | 59-12577 A | 7/1984 |
| JP | H8-8-187537 | 7/1996 |
| JP | 2019-502069 | 1/2019 |
| JP | 7066618 | 5/2022 |
| PT | 87843 B | 5/1989 |
| WO | 9715774 A1 | 5/1997 |
| WO | 2017105840 A1 | 6/2017 |

OTHER PUBLICATIONS

"International Search Report" and "Written Opinion" of the International Search Authority (ISA/US) in Chatsworth Products, Inc., International Patent Application Serial No. PCT/US2016/064135, dated Feb. 7, 2017 (10 pages).

* cited by examiner

ENDCAP FOR ESTABLISHING ELECTRICAL BONDING CONNECTION

CROSS-REFERENCE TO RELATED APPLICATIONS

The present application is a U.S. nonprovisional patent application of, and claims priority under 35 U.S.C. § 119(e) to, each of:
(a) U.S. provisional patent application Ser. No. 63/157,938, filed Mar. 8, 2021, which '938 application is incorporated by reference herein in its entirety, and a copy of which is appended hereto as Appendix A, which Appendix A is incorporated by reference herein in its entirety;
(b) U.S. provisional patent application Ser. No. 63/174,945, filed Apr. 14, 2021, which '945 application is incorporated by reference herein in its entirety; and
(c) U.S. provisional patent application Ser. No. 63/213,448, filed Jun. 22, 2021, which '448 application is incorporated by reference herein in its entirety, and a copy of which is appended hereto as Appendix B, which Appendix B is incorporated by reference herein in its entirety.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to establishing an equipotential plane across a telecommunications equipment ecosystem, and, in particular, to interconnection of cable runway sections in a telecommunications equipment ecosystem to electrically bond the sections within an equipotential plane.

Background

In any device or system utilizing electrical power, it is important to reduce electrical safety and operational issues via proper grounding and/or bonding. The electrical protection of today's high-speed cabling systems is an essential part of a properly designed and installed information and communications technology (ICT) infrastructure. A bonding and grounding system will aid in controlling negative influences such as electromagnetic interference (EMI), electrostatic discharge (ESD) or ground potential rise from lightning.

The idea in electrical bonding is to bring a series of devices or structures to the same electrical potential so that a fault current does not cause one element of the system to become energized or "hot" (leading to a shock or fire hazard). Bonding prevents this because, without potential differences, there is no voltage differential seeking a path. In the event of a fault, the current automatically eases and helps prevent a structure from going hot. Although bonding by itself does not protect people or devices, when combined with grounding, it is a staple of safe electrical design.

Bonding and grounding in a telecommunications equipment ecosystem typically involve electrically bonding many different components together to share an equipotential plane. Establishing electrical bonding connections can be particularly challenging in environments that involve numerous components that are capable of arrangement in countless different configurations, such as in a cable runway. Usually, electrically bonding of cable runway sections to fabricate an equipotential plane involves field alteration of manufactured sections through drilling and/or removal of a manufacturer-applied powder coating that covers electrically conductive components. However, when cable runway sections are modified in the field, the conductivity of those sections and their associated hardware can be restricted, thereby reducing the ability to equalize potentials during lightning and other unwanted transient conditions. Additionally, drilling and/or removal of a powder coating exposes the metal alloy to oxidation and rust. Because drilling and/or coating removal must be completed after the cable runway is installed, there are safety risks to personnel as well as a risk of contaminating the environment around vulnerable micro-processing computer equipment.

One of the more common techniques for field modification of a cable runway to facilitate a shared electrical bonding connection involves installation of electrical bonding straps between sections of cable runway to provide electrical continuity. However, this technique is representative of the general technique described above, as connection of the electrical bonding straps understandably involves drilling holes in existing components, removing paint or powder coating, and securing the straps with hardware.

Another technique for electrically bonding components of a cable runway in the field utilizes a splice bar that can be received within an interior of each of two adjacent co-linear sections of an existing cable runway. However, the splice bar still requires field modification in the form of drilling through existing cable runway sections, and the splice bar is not compatible with junction splice kits or with external bonding applications. Similar to the splice bar, a spring clip that extends between the interiors of two adjacent co-linear sections of a cable runway has also been utilized to establish an electrical bonding connection between sections, but likewise suffers from similar disadvantages.

In view of these and other disadvantages, a need exists for an improved approach to electrical bonding in a cable runway system without requiring field modification or alteration. Additionally, a need exists for an improved approach to electrical bonding in a cable runway system to allow the interconnection of cable runway sections, equipment racks, and cabinets, irrespective of configuration, to establish an equipotential plane. These and/or other needs are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

The present invention includes many aspects and features. Moreover, while many aspects and features relate to, and are described in, the context of the interconnection of cable runway sections, the present invention is not limited to use only in the interconnection of cable runway sections, as will become apparent from the following summaries and detailed descriptions of aspects, features, and one or more embodiments of the present invention Broadly defined, the present invention according to one aspect relates to a bracket assembly for establishing an equipotential plane in a cable runway. The bracket assembly includes a cable runway splice kit and a pair of bonding endcaps. The cable runway splice kit includes at least one splice bracket made from an electrically-conductive material. The bonding endcaps are also made from an electrically-conductive material, and each bonding endcap includes a bonding lug, a spring clip, and a deflectable tab structure that protrudes from the bonding lug. Each spring clip is positionable within a channel of a corresponding cable runway rail for electrical bonding therewith, and each bonding lug includes a contact portion received within the spring clip for electrical bonding therewith. When the cable runway rails are arranged in an end-to-end relationship, ends of the cable runway rails having the bonding endcaps are receivable within a bracket channel of the at least one splice bracket such that the deflectable tab structure of each bonding endcap is engaged against and is deflected by the at least one splice bracket, thereby establishing an electrical bonding connection between the pair of cable runway rails through the at least one splice bracket and creating a shared equipotential plane.

In a feature of this aspect, the end-to-end relationship is a co-linear relationship.

In another feature of this aspect, the end-to-end relationship is an angled relationship. In another feature of this aspect, the end-to-end, angled relationship is a perpendicular relationship.

In another feature of this aspect, the cable runway splice kit includes a pair of splice brackets positionable at opposite sides of the pair of cable runway rails. In another feature of this aspect, the cable runway splice kit includes a fastener for clamping the splice brackets together from opposite sides of the pair of cable runway rails.

In another feature of this aspect, the bonding endcap at one of the pair of cable runway rails does not directly engage the bonding endcap at the other of the pair of cable runway rails.

In another feature of this aspect, each bonding lug includes a side arm extending at each side of the contact portion, the side arms being arranged at external sides of the corresponding cable runway rail when the bonding lug is seated within the spring clip. In another feature of this aspect, each side arm provides an external electrical bonding location for joining an external structure to the shared equipotential plane. In another feature of this aspect, each side arm includes one or more apertures for accommodating a fastener that secures the external structure to one of the side arms.

In another feature of this aspect, the spring clip is made from a highly conductive alloy material. In another feature of this aspect, the highly conductive alloy material includes a beryllium copper material.

In another feature of this aspect, one or both of the bonding lug and the deflectable tab structure is made from a die cast zinc material.

In another feature of this aspect, the spring clip includes two side walls that extend forward from a rear wall and flare apart from one another at distal ends thereof. In another feature of this aspect, each side wall includes one or more contact tabs for engaging and electrically bonding with an interior portion of the channel of the corresponding cable runway rail when the contact portion of the bonding lug is received within the spring clip.

In another feature of this aspect, the deflectable tab structure includes a pair of contact portions, each of which protrudes from an opposite side of the bonding lug.

Broadly defined, the present invention according to another aspect relates to a bonding endcap for use in connection with a bracket assembly for establishing an equipotential plane in a cable runway. The bonding endcap includes a spring clip and a bonding lug, each of which is made from an electrically conductive material. The spring clip has two side walls that extend forward from a rear wall and is positionable within a channel of a cable runway rail. The bonding lug includes a contact portion and a side arm extending at each side of the contact portion. The contact portion of the bonding lug is receivable between the side walls of the spring clip to deflect the side walls and establish an electrical bonding connection from the cable runway rail, through the spring clip, and to the bonding lug.

In a feature of this aspect, the bonding endcap further includes a deflectable tab structure made from an electrically conductive material and includes at least one contact portion that protrudes from the bonding lug at an angle. In another feature of this aspect, positioning of an end of the cable runway rail having the bonding endcap against a splice bracket causes the at least one contact portion to engage with and be deflected by the splice bracket, thereby sharing the electrical bonding connection with the splice bracket.

In another feature of this aspect, each side arm provides an external electrical bonding location for an external structure. In another feature of this aspect, each side arm includes one or more apertures for accommodating a fastener that secures the external structure to one of the side arms.

In another feature of this aspect, the spring clip is made from a highly conductive alloy material. In another feature of this aspect, the highly conductive alloy material includes a beryllium copper material.

In another feature of this aspect, the bonding lug is made from a die cast zinc material.

In another feature of this aspect, each side wall includes one or more contact tabs for engaging and electrically bonding with an interior portion of the channel of the cable runway rail when the contact portion of the bonding lug is received within the spring clip.

In another feature of this aspect, the deflectable tab structure includes a pair of contact portions, each of which protrudes from an opposite side of the bonding lug.

Broadly defined, the present invention according to another aspect relates to a method of installing a bracket assembly in a cable runway. The method includes: providing a cable runway splice kit including at least one splice bracket made from an electrically-conductive material; providing a pair of electrically-conductive cable runway rails, each defining a channel at an end thereof; providing a pair of bonding endcaps made from an electrically-conductive material, each bonding endcap including a bonding lug, a spring clip, and a deflectable tab structure that protrudes from the bonding lug; positioning each spring clip within the channel of a respective one of the pair of cable runway rails; positioning a contact portion of each bonding lug within a respective spring clip, thereby deflecting walls of the spring clip to engage interior sides of the channel of the cable runway rail and establishing an electrical bonding connection between each cable runway rail and its respective spring clip and bonding lug; and positioning ends of the cable runway rails having the bonding endcaps within a bracket channel of the at least one splice bracket such that a contact tab of each deflectable tab structure engages and is deflected by the at least one splice bracket, thereby creating a shared equipotential plane between the pair of cable runway rails through the at least one splice bracket.

In a feature of this aspect, the cable runway rails are arranged in a co-linear relationship.

In a feature of this aspect, the cable runway rails are arranged in an angled relationship.

In another feature of this aspect, the cable runway rails are arranged in a perpendicular relationship.

In another feature of this aspect, the cable runway splice kit includes a pair of splice brackets positionable at opposite sides of the pair of cable runway rails. In another feature of this aspect, the method further includes clamping the splice brackets together with a fastener.

In another feature of this aspect, the bonding endcap at one of the pair of cable runway rails does not directly engage the bonding endcap at the other of the pair of cable runway rails.

In another feature of this aspect, each bonding lug includes a side arm extending at each side of the contact portion, the side arms being arranged at external sides of the corresponding cable runway rail when the bonding lug is seated within the spring clip. In another feature of this aspect, the method further includes securing an external structure to one of the side arms of one of the bonding endcaps, thereby joining the external structure to the shared equipotential plane.

Broadly defined, the present invention according to another aspect relates to a bracket assembly for establishing an equipotential plane in a cable runway substantially as shown and described.

Broadly defined, the present invention according to another aspect relates to a bonding endcap for use in connection with a bracket assembly for establishing an equipotential plane in a cable runway substantially as shown and described.

Broadly defined, the present invention according to another aspect relates to a method of installing a bracket assembly in a cable runway substantially as shown and described.

Further areas of applicability of the present invention will become apparent from the detailed description provided hereinafter. It should be understood that the detailed description and specific examples, while indicating preferred embodiment(s) of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1:
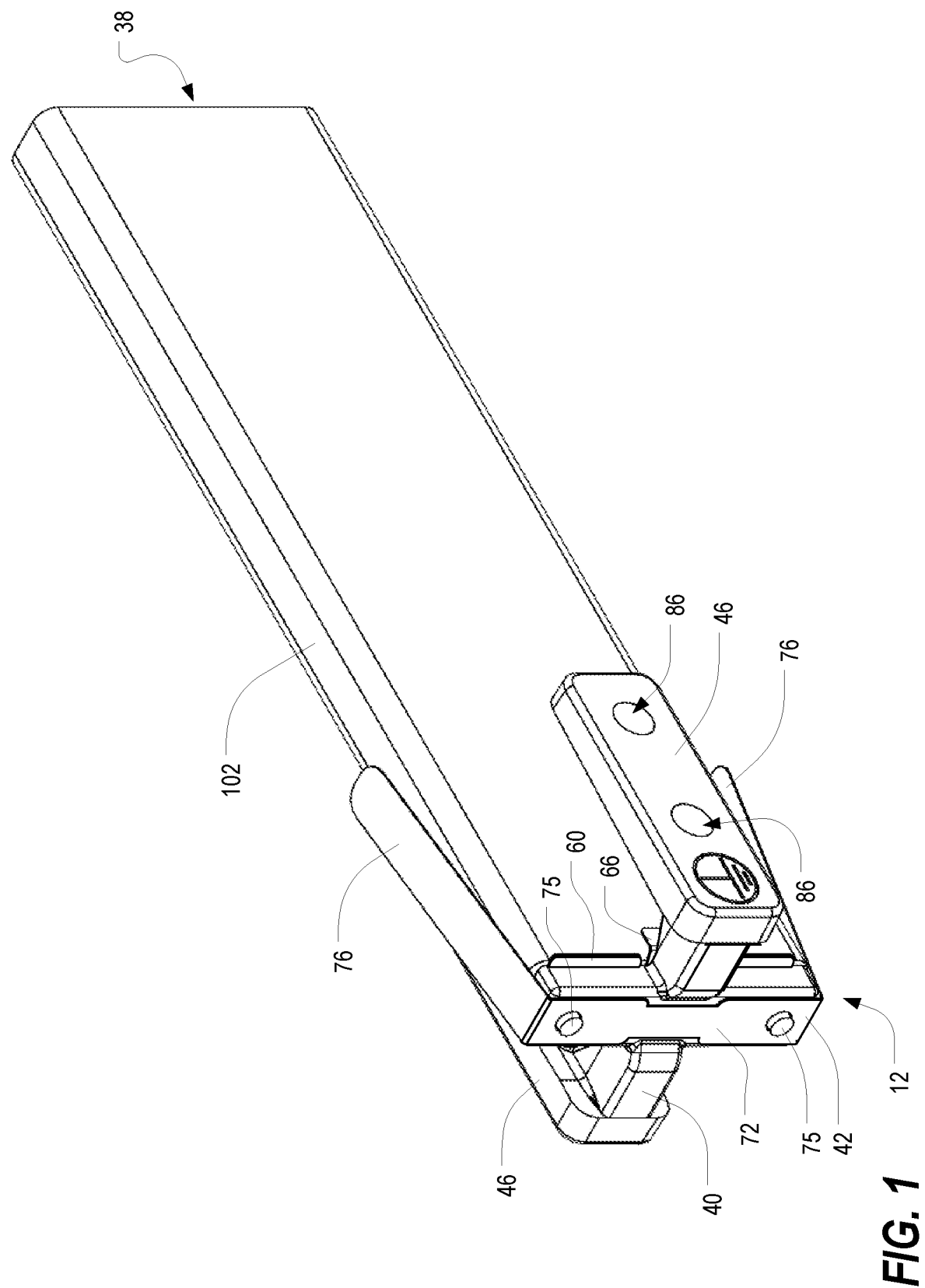
FIG. 1 is an isometric view of a bonding endcap in accordance with one or more aspects of the present invention, shown installed at an end of a cable runway rail.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Furthermore, an embodiment of the invention may incorporate only one or a plurality of the aspects of the invention disclosed herein; only one or a plurality of the features disclosed herein; or combination thereof. Moreover, many embodiments, including adaptations, variations, modifications, and equivalent arrangements, are implicitly disclosed herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention in any claim of a patent issuing here from, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the issued claim(s) rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

With regard solely to construction of any claim with respect to the United States, no claim element is to be interpreted under 35 U.S.C. 112(f) unless the explicit phrase "means for" or "step for" is actually used in such claim element, whereupon this statutory provision is intended to and should apply in the interpretation of such claim element. With regard to any method claim including a condition precedent step, such method requires the condition precedent to be met and the step to be performed at least once during performance of the claimed method.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Further, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

FIG. 1 is an isometric view of a bonding endcap 12 in accordance with one or more aspects of the present invention, shown installed at an end of a cable runway rail 102. In a contemplated embodiment, the cable runway rail 102 is a steel member having a hollow interior 38 and a generally rectangular cross-sectional shape. It is further contemplated that other shapes, configurations, and electrically-conductive materials can be used with respect to the cable runway rails 102. The bonding endcap 12 is fittingly received within and against a hollow interior at an end of the cable runway rail 102, and, in this manner, provides a connection point for sharing an equipotential plane carried by the electrically-conductive cable runway rail.

Figure 2:
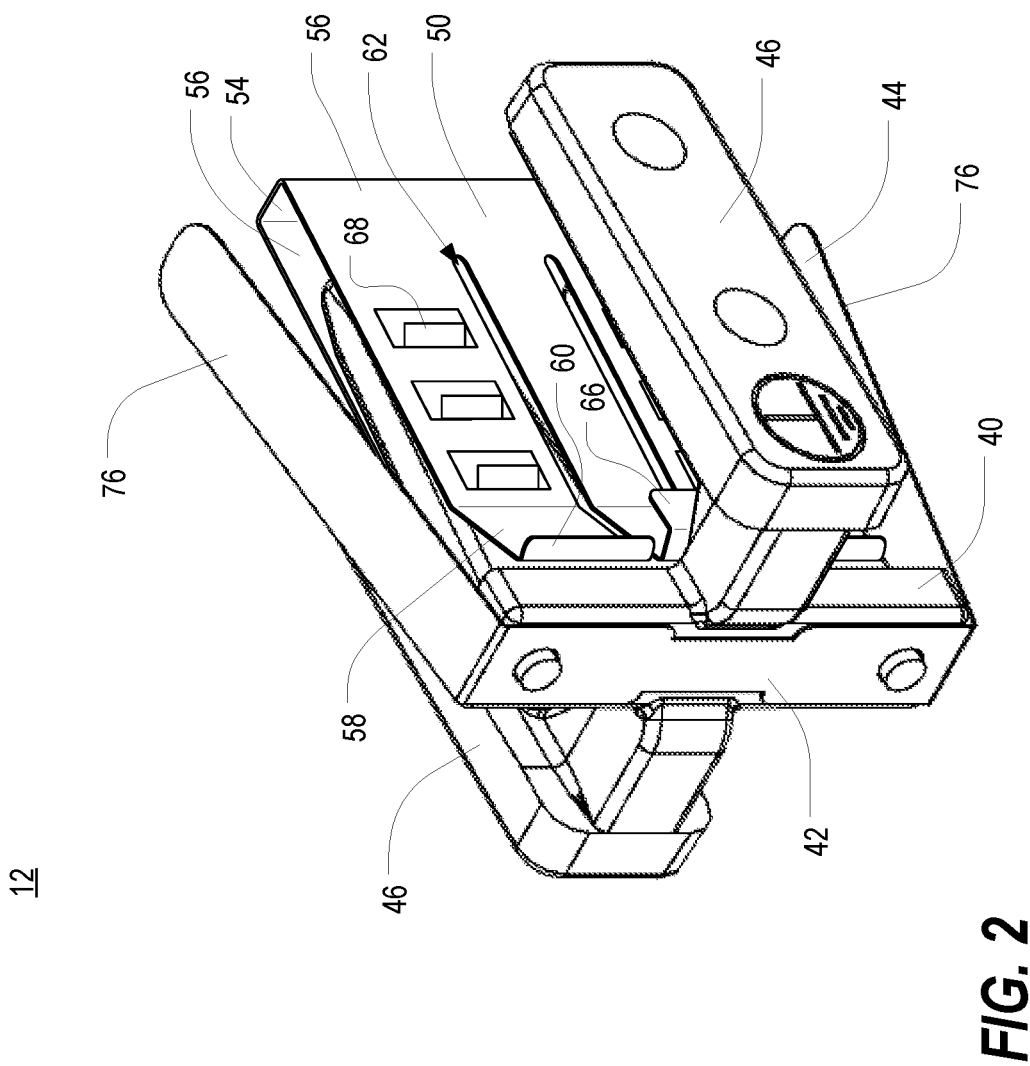
FIG. 2 is an isometric view of the bonding endcap of FIG. 1.
Figure 3A:
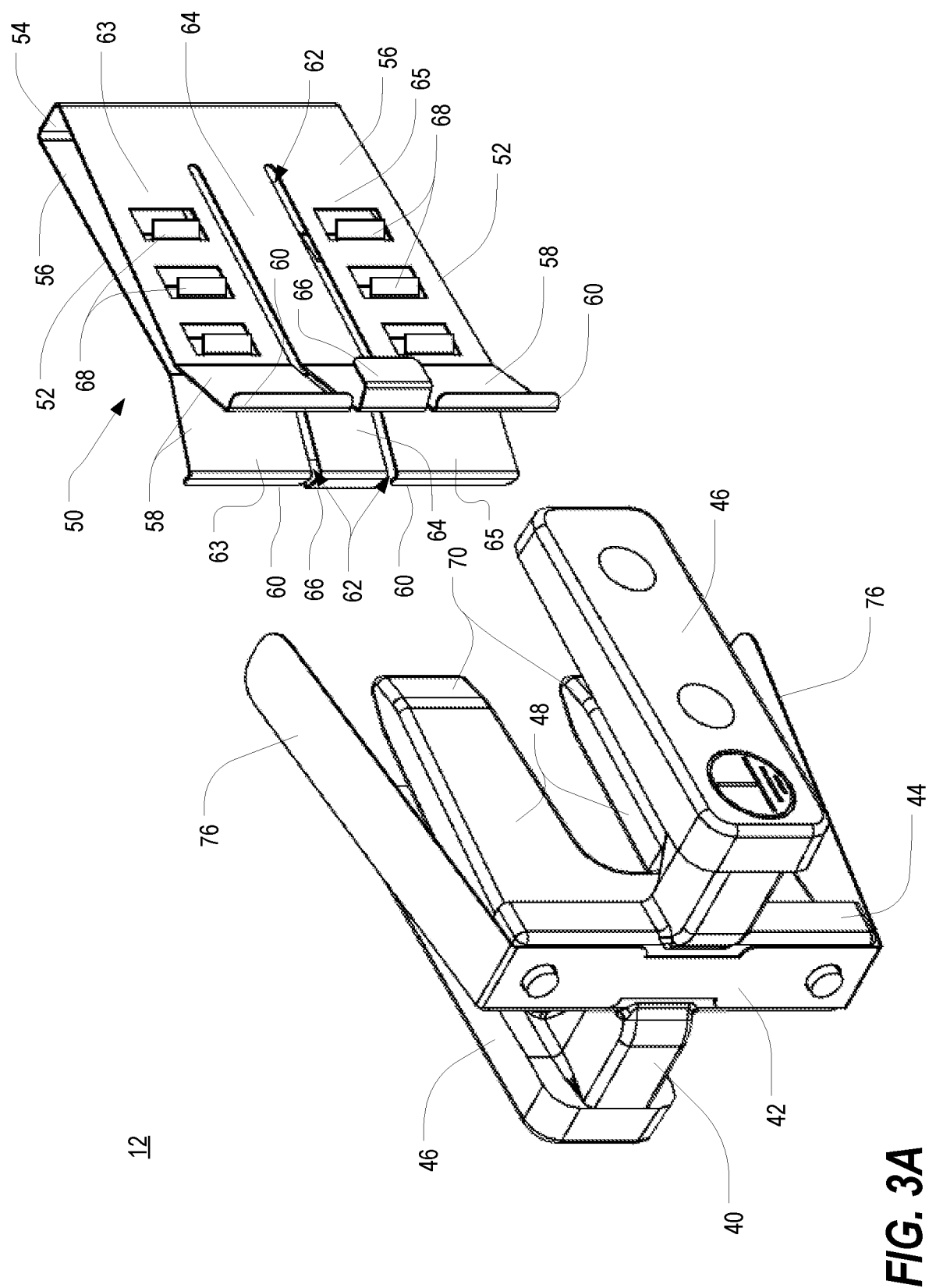
FIGS. 3A and 3B are an exploded isometric view and an exploded side view, respectively, of the bonding endcap of FIG. 2.
Figure 3B:
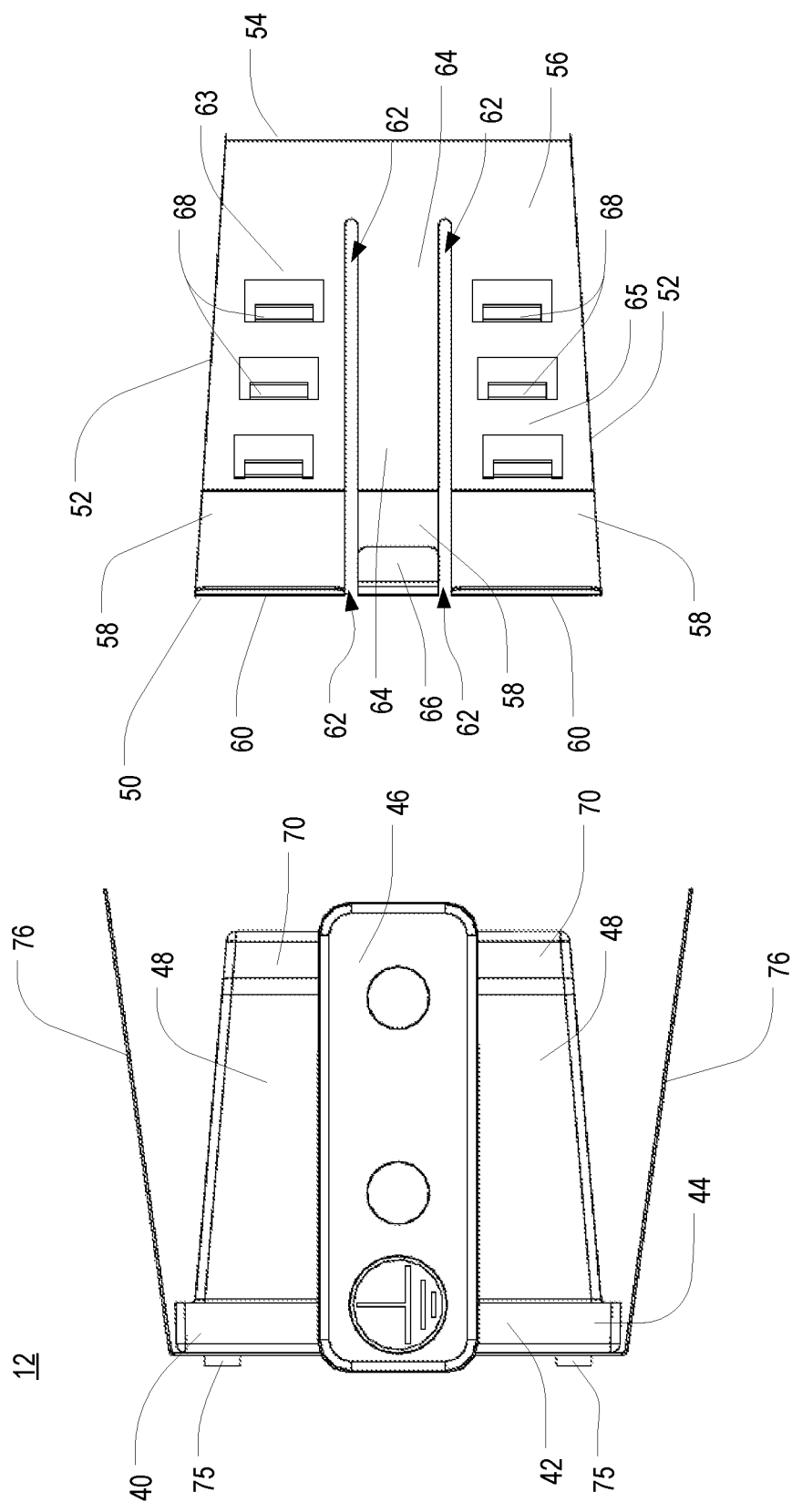

FIG. 2 is an isometric view of the bonding endcap 12 of FIG. 1, while FIGS. 3A and 3B are an exploded isometric view and an exploded side view, respectively, of the bonding endcap 12 of FIG. 2. As shown therein, the bonding endcap 12 includes a bonding lug 40, a spring clip 50, and a deflectable tab structure 42. As shown in FIGS. 2, 3A, and 3B, the spring clip 50 includes a pair of deflectable side walls 52 that extend forward from a rear wall 54. The spring clip 50 is sized and shaped to be received within the hollow interior 38 at an end of one of the cable runway rails 102. The spring clip 50 is made from a highly conductive alloy material, which in at least some embodiments includes a beryllium copper material.

As perhaps best shown in FIGS. 3A and 3B, each side wall 52 of the spring clip 50 includes a first section 56 that extends from the rear wall 54 at an acute angle such that the first sections 56 extend toward one another. Each side wall 52 of the spring clip 50 also includes a second section 58 that extends from the first section 56 at an obtuse angle such that the second sections 58 extend away from each other in an outward direction. Distal ends of the side walls 52 include outwardly-directed flanges 60. Additionally, it is contemplated that each side wall 52 may include slots 62 extending from the distal ends thereof toward the rear wall 54 such that each side wall 52 is divided into segments 63, 64, 65. In this regard, it is further contemplated that one or more of the segments 63, 64, 65 may include a hooked tab 66 at the distal end thereof; in the illustrated embodiment, only the middle segments 64 have such a tab 66. Each side wall 52 also includes a plurality of contact tabs 68 arranged along at least the first section 56 thereof. Each contact tab 68 extends from the respective side wall 52 in an outward direction for contact with an adjacent structure and may be formed by bending portions of the first sections 56 outward.

Figure 4:
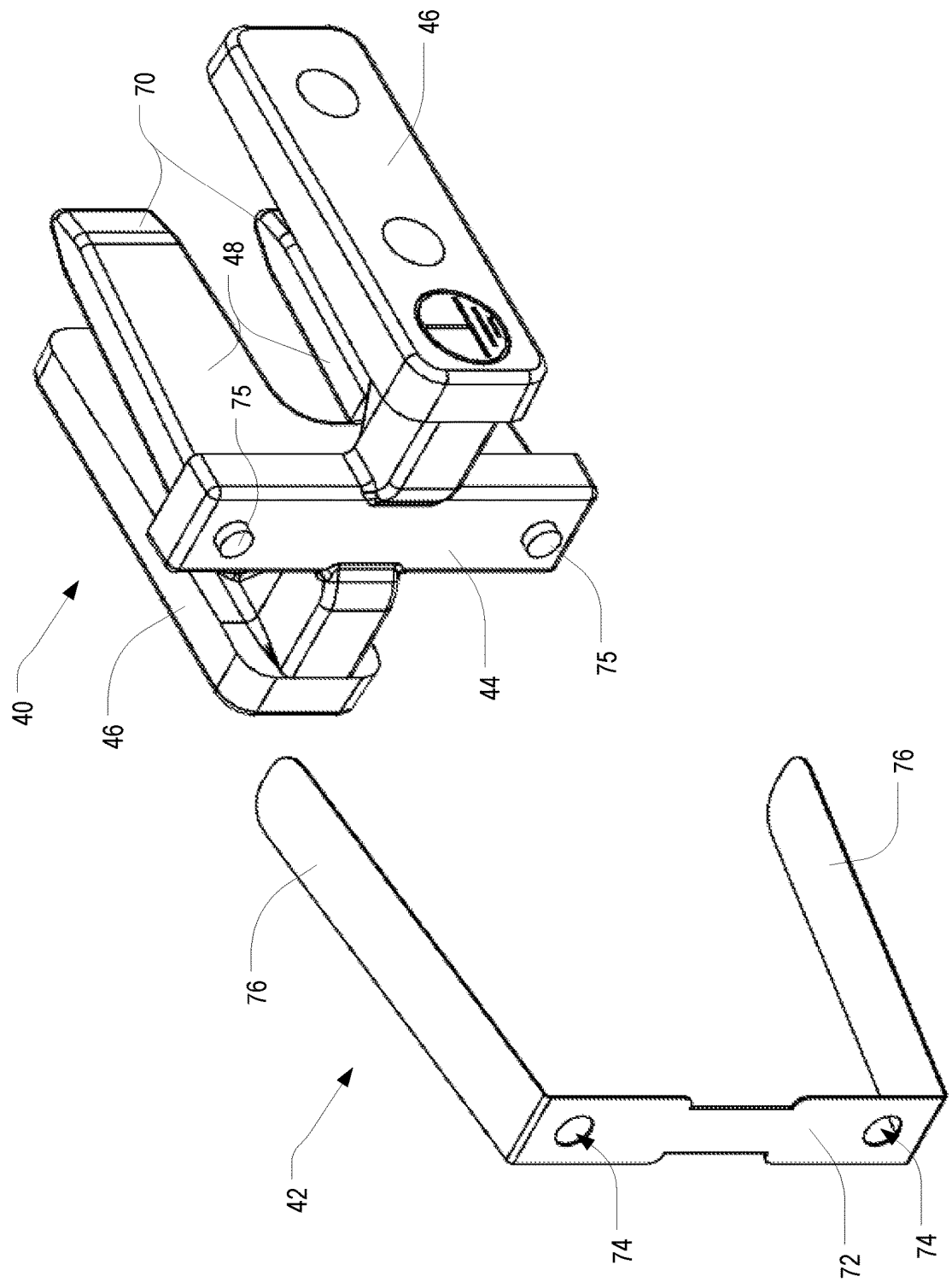
FIG. 4 is an exploded isometric view of the bonding lug and deflectable tab structure of FIGS. 3A and 3B.

FIG. 4 is an exploded isometric view of the bonding lug 40 and deflectable tab structure 42 of FIGS. 3A and 3B. With particular reference to FIGS. 3A, 3B, and 4, the bonding lug 40 includes a central body 44 and a pair of side arms 46 extending along either side of the central body 44. As with the spring clip 50, the bonding lug 40 is made from an electrically conductive material. In at least some embodiments, the bonding lug 40 is made from a die cast zinc material. The central body 44 includes a central plug 48 that terminates in a tapered end 70. In at least some embodiments, it is contemplated that the central plug 48 is bifurcated or split into a plurality of plug portions with each such plug portion terminating in a tapered end 70. Each side arm 46 has a first portion that extends from a side of the central body 44 and a second portion that extends at a right angle from the first portion in the same direction as the central plug 48. In this manner, the second portion of each side arm 46 is laterally spaced apart from the central body 44 and the central plug 48.

With further reference to FIGS. 3A, 3B, and 4, the deflectable tab structure 42 is in the form of an elongate body and is made from a deflectable and resilient electrically-conductive material. The deflectable tab structure 42 includes a central portion 72 and a pair of tab portions 76 that extend from opposite ends of the central portion 72 at angles such that the tab structure is generally C-shaped. The central portion 72 of the tab structure 42 includes a pair of spaced-apart apertures 74 that receive corresponding protrusions 75 arranged along the central body 44 of the bonding lug 40 when the tab structure 42 is seated thereagainst. When the deflectable tab structure 42 is seated against the bonding lug 40, the central portion 72 is aligned against the central body 40, and the tab portions 76 extend outwardly away from sides of the central plug 48 of the central body 40. Additionally, when seated against the bonding lug 40, the deflectable tab structure 42 establishes an electrical bonding connection therewith.

With reference to FIGS. 2, 3A, and 3B, the central plug 48 of the bonding lug 40 (with the deflectable tab structure 42 thereagainst) is receivable within the spring clip 50. More particularly, the inwardly-tapered ends 70 of the central plug 48 may be positioned at the flared opening between the second sections 58 of the spring clip side walls 52. Application of a force against the bonding lug 40 causes the tapered ends 70 of the central plug 48 to deflect the side walls 52 outward at the junction between the first and second sections 56, 58. Continued application of the force against the bonding lug 40 positions the central plug 48 between the side walls 52. The side walls 52, which are biased to return to an undeflected state, apply an inward clamping force against the central plug 48 that helps to retain the central plug 48 within the spring clip 50. When the central plug 48 is received and retained within the spring clip 50, the side arms 46 of the bonding lug 40 and the tab portions 76 of the deflectable tab structure 42 are arranged to extend along the side walls 52 of the spring clip 50. The bonding endcap 12 is equipped to provide an electrical bonding connection to one or more adjacent structures, as will be explained in greater detail below.

Figure 5:
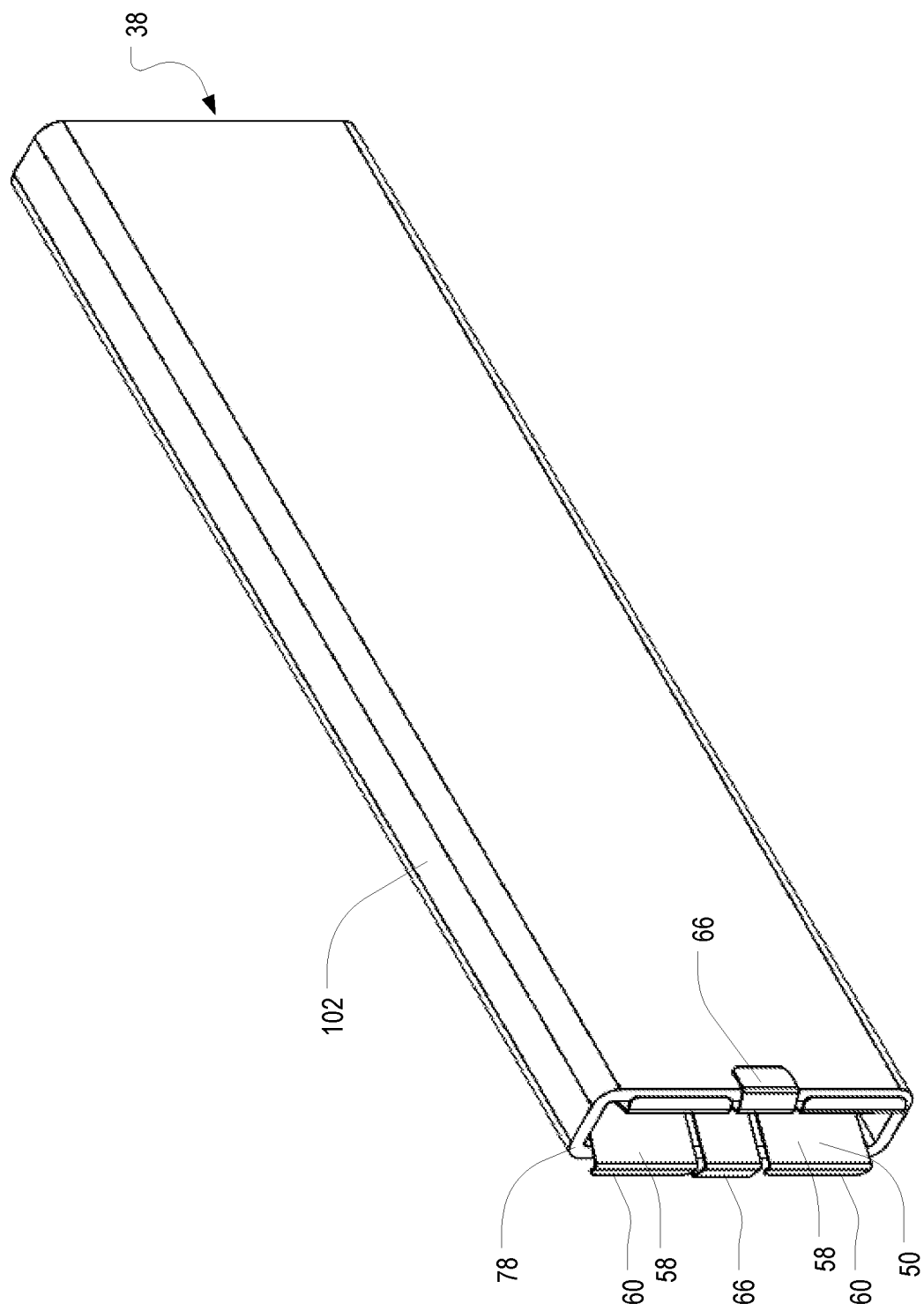
FIG. 5 is an isometric view of the spring clip of FIGS. 3A and 3B, shown partially installed within an interior of a cable runway rail.

FIG. 5 is an isometric view of the spring clip 50 of FIG. 2 shown partially installed within an interior 38 of a cable runway rail 102. As shown in FIG. 5 and with further reference to FIG. 1, the spring clip 50 is receivable within the hollow interior 38 of a cable runway rail 102. It is contemplated that the spring clip 50 is dimensioned to be placed within the interior of the cable runway rail 102 such that the outwardly-directed flanges 60 are in abutment with the exterior-facing end edge 78 of the cable runway rail 102 so as to keep the clip 50 from being inserted too deeply into the rail 102. Additionally, the hooked tabs 66 of the spring clip 50 hook around the end edge 78 of the cable runway rail 102 to help retain the spring clip 50 in the inserted position and/or to facilitate removal if necessary. Notably, in FIG. 5, the spring clip 50 is not quite fully inserted into the hollow interior 38; final insertion may, if desired, be achieved by as part of the process of forcing the bonding lug 40 into the spring clip 50.

With the spring clip 50 in the end of the rail 102, the central plug 48 of the bonding lug 40 (with the deflectable tab structure 42 thereagainst) is pressed into the spring clip 50 at the end of the cable runway rail 102 as perhaps best shown in FIGS. 1 and 2. As discussed above, the tapered ends 70 of the central plug 48 deflect the side walls 52 outwardly at the junction between the first and second sections 56, 58. The side walls 52 of the spring clip 50 are biased to return to an undeflected state and apply an inward clamping force against the central plug 48. Additionally, with the side walls 52 of the spring clip 50 deflected outward by the bonding lug 40, one or more of the contact tabs 68 arranged along the side walls 52 engage interior surfaces of the cable runway rail 102. In this regard, an equipotential plane carried by the electrically-conductive cable runway rail 102 is shared with the spring clip 50 through contact with the contact tabs 68 and/or the outwardly-directed flanges 60 and hooked tabs 66 of the spring clip 50. The equipotential plane can then be shared with the bonding lug 40 via the connection between the side walls 52 of the spring clip 50 and the central plug 48 of the bonding lug 40 and other contact points. Notably, when the central plug 48 is seated within the spring clip 50, the side arms 46 of the bonding lug 40 are arranged at opposite sides of, and spaced apart from, the cable runway rail 102. Additionally, the tab portions 76 of the deflectable tab structure 42 are arranged to extend along the top and bottom surfaces of the cable runway rail 102.

Figure 6:
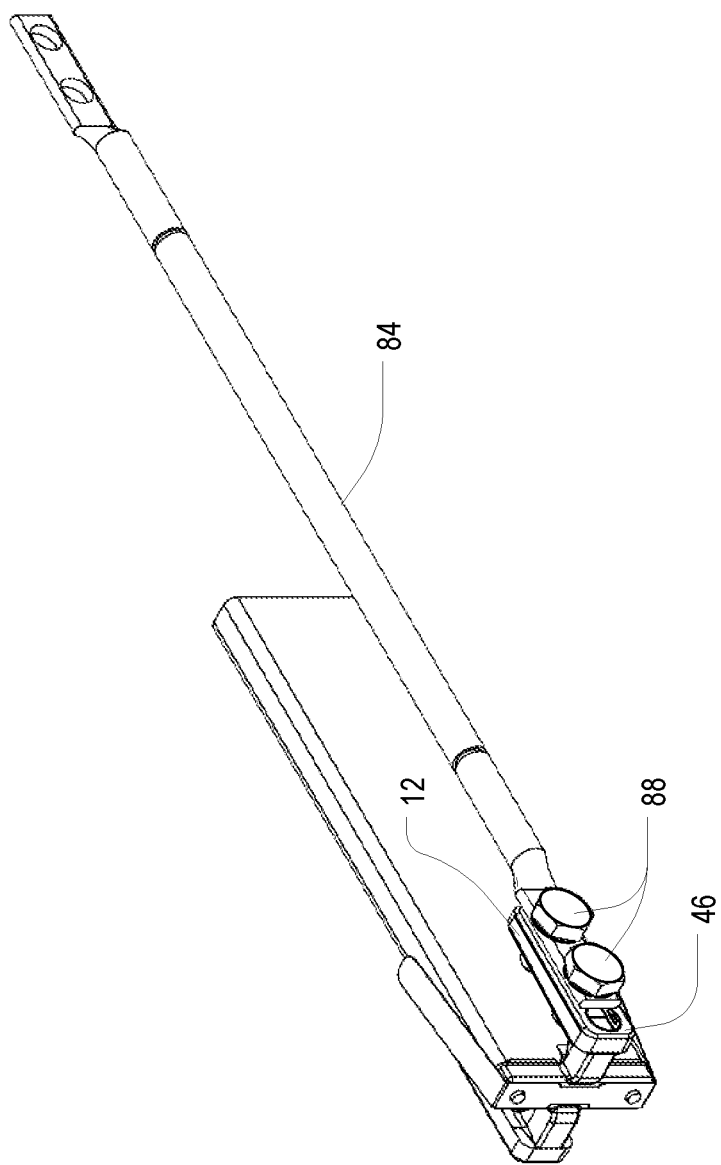
FIG. 6 is an isometric view of the bonding endcap and cable runway rail of FIG. 1, shown with an external bonding device attached to the bonding endcap.

Further electrical bonding may be achieved using the side arms 46 of the bonding lugs 40. In this regard, FIG. 6 is an isometric view of the bonding endcap 12 and cable runway rail 102 of FIG. 1, shown with an external bonding device 84 attached to the bonding endcap 12. As shown in FIG. 6, an electrically-conductive external bonding device 84, such as a cable with cable connectors as illustrated, is physically attachable to the bonding lug 40 at one of the side arms 46. Each side arm 46 of the bonding lug 40 includes one or more apertures 86 for accommodating a separate fastener 88 therethrough for securing the external bonding device 84. An equipotential plane at the bonding lug 40 can be shared with the external bonding device 84 either through direct contact therewith (i.e., by the external bonding device 84 being secured against one of the side arms 46) or through use of an electrically-conductive fastener 88 connecting the external bonding device 84 to the side arm 46. It is contemplated that, if desired, a different external bonding device 84 can be secured to each side arm 46 of a single bonding endcap 12 to electrically bond both devices 84 within the equipotential plane.

Figure 7:
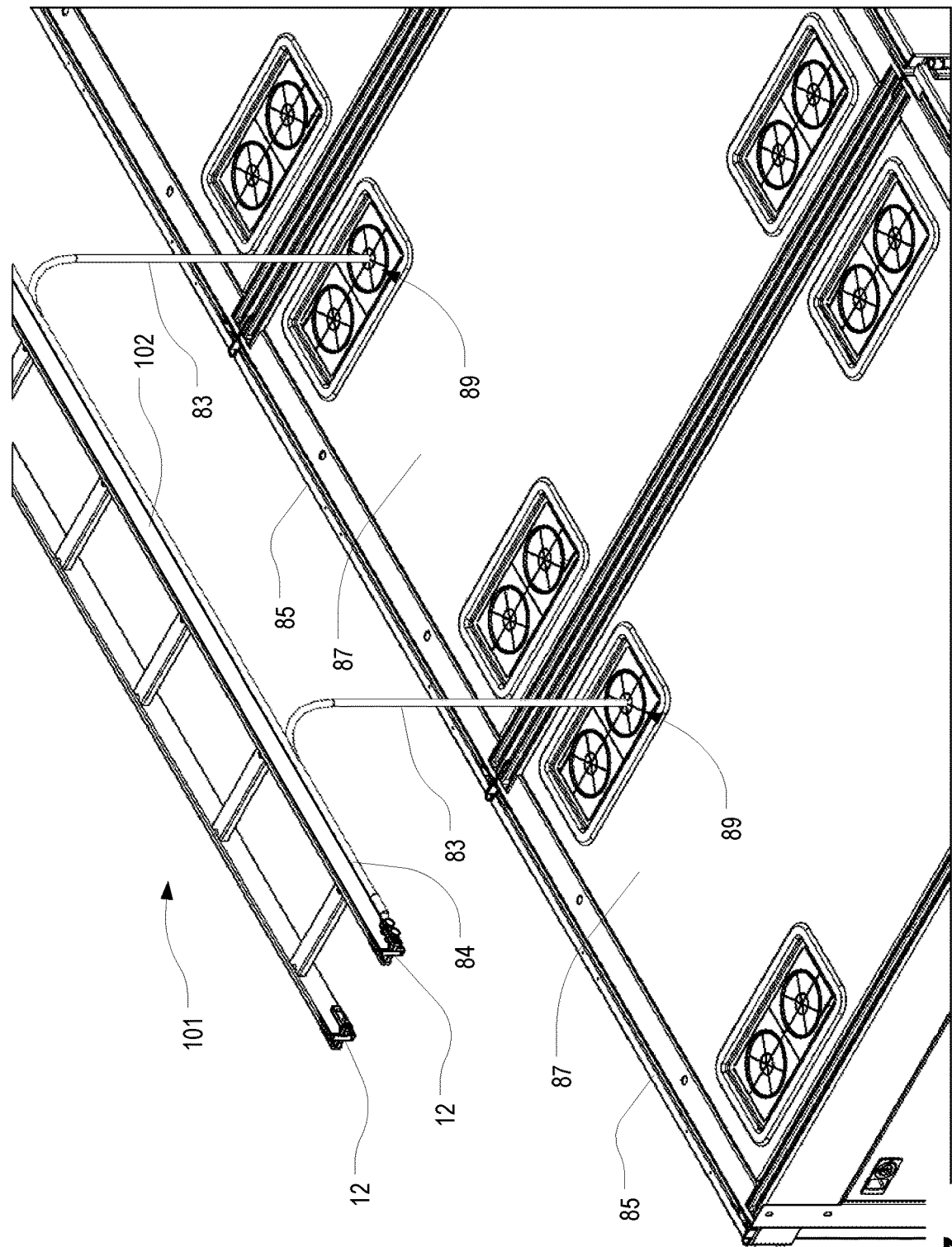
FIG. 7 is an isometric view of a section of a section of cable runway with an external bonding device attached to a bonding endcap seated in one of the rails to share an equipotential plane with each of a plurality of equipment cabinets.

It is further contemplated that external bonding devices may include one or more applications for low voltage infrastructure, including, but not limited to, relay racks, equipment cabinets, and the like. In this regard, FIG. 7 is an isometric view of a section of a section of cable runway 101 with an external bonding device 84 attached to a bonding endcap 12 seated in one of the rails 102 to share an equipotential plane with each of a plurality of equipment cabinets 85. Here, an external bonding device 84 extends from the bonding endcap 12 adjacent to the rail 102 before dropping downward toward a row of equipment cabinets 85 arranged beneath the runway 101. It is contemplated that the external bonding device 84 may be branched to facilitate different sections 83 of the device 84 dropping toward different cabinets 85. In the illustrated embodiment, each branched section 83 drops through a port 89 of a top panel 87 and into an interior of the cabinet 85 to facilitate electrical bonding with a structure therein.

Because each bonding endcap 12 includes a pair of side arms 46, a high number of available connection points can exist within a cable runway system, even in areas that might otherwise be difficult to access. It is therefore not necessary to drill or otherwise provide additional apertures to facilitate attachment. In this regard, tapped holes through the side arms 46 of the bonding lugs 40 facilitate a range of additional options to connect and provide bonding to other equipment racks, cabinets, or other bonding brackets.

Figure 8:
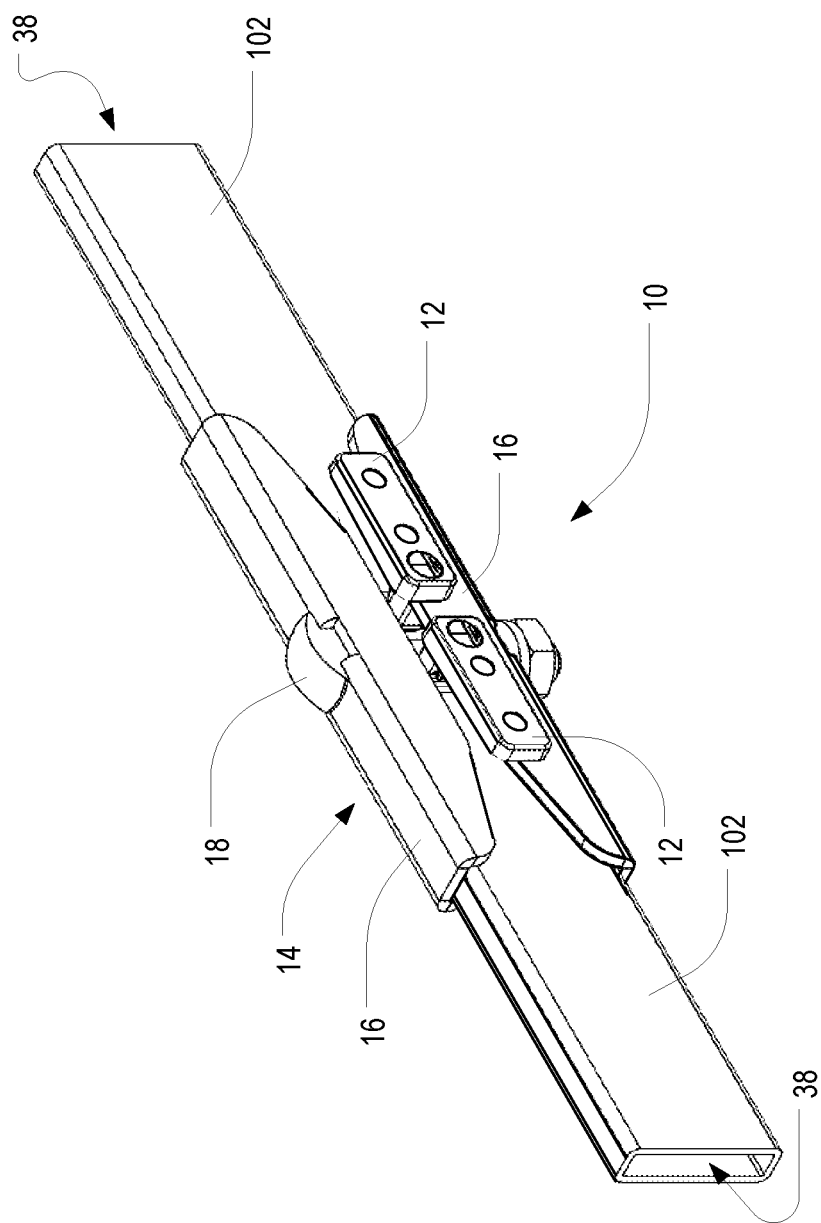
FIG. 8 is an isometric view of a bracket assembly for establishing an electrical bonding connection in accordance with one or more preferred embodiments of the present invention, shown installed with respect to a pair of cable runway rails arranged in a co-linear relationship.
Figure 9:
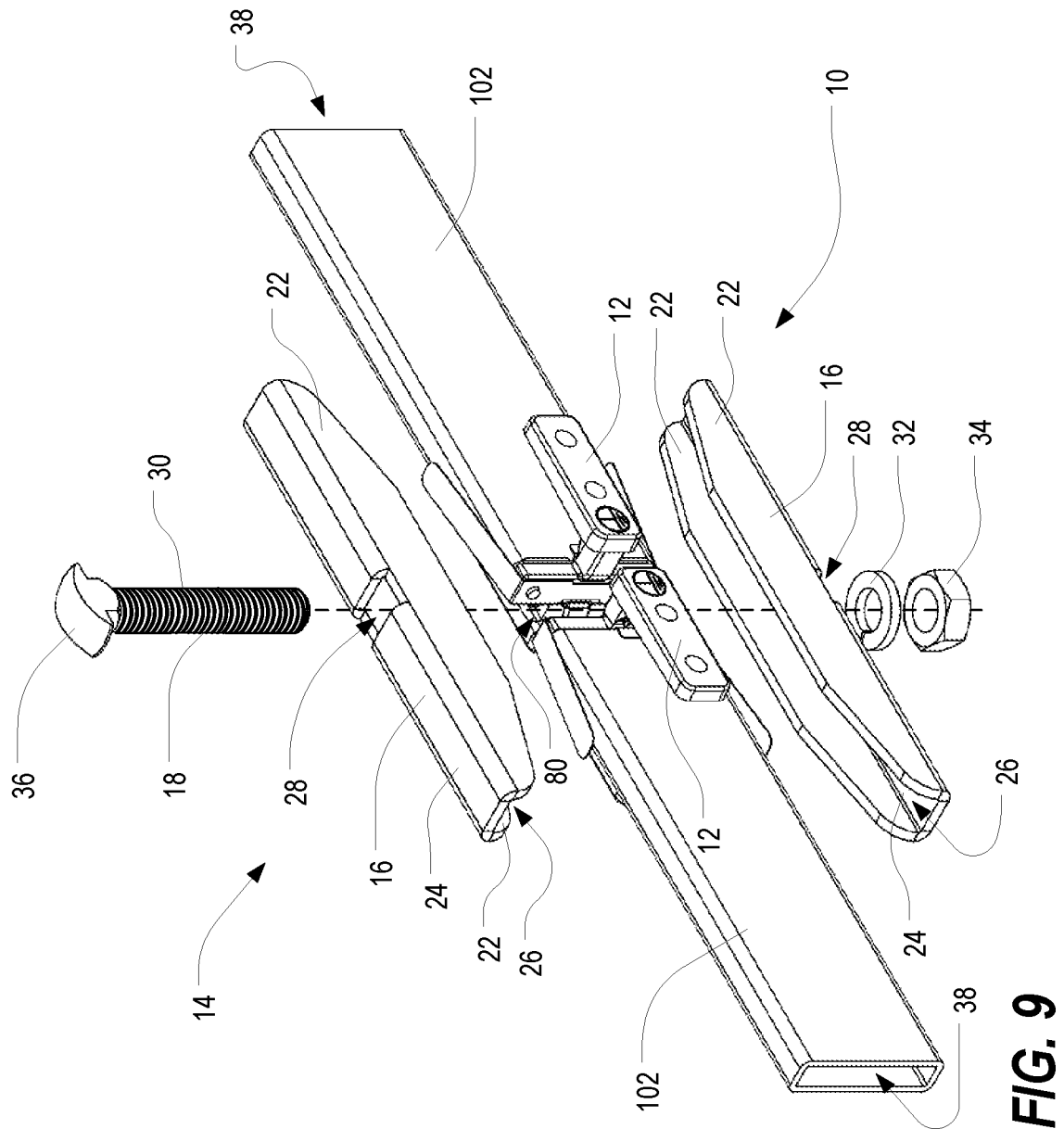
FIG. 9 is a partially exploded isometric view of the bracket assembly and the pair of cable runway rails of FIG. 8.

FIG. 8 is an isometric view of a bracket assembly 10 for establishing an electrical bonding connection in accordance with one or more preferred embodiments of the present invention, shown installed with respect to a pair of cable runway rails 102 arranged in a co-linear relationship, and FIG. 9 is a partially exploded isometric view of the bracket assembly 10 and the pair of cable runway rails 102 of FIG. 8. The bracket assembly 10 for establishing an electrical bonding connection in a cable runway includes a pair of bonding endcaps 12 and a cable runway splice kit 14. Each bonding endcap 12 is disposed at an end of one of the pair of cable runway rails 102. The cable runway splice kit 14 includes a pair of splice brackets 16 that each receive end portions of the cable runway rails 102, which are arranged facing each other in a co-linear relationship. The runway splice kit 14 also includes a fastener 18 that extends through both splice brackets 16 and retains the brackets 16 on the cable runway rails 102.

Figure 10:
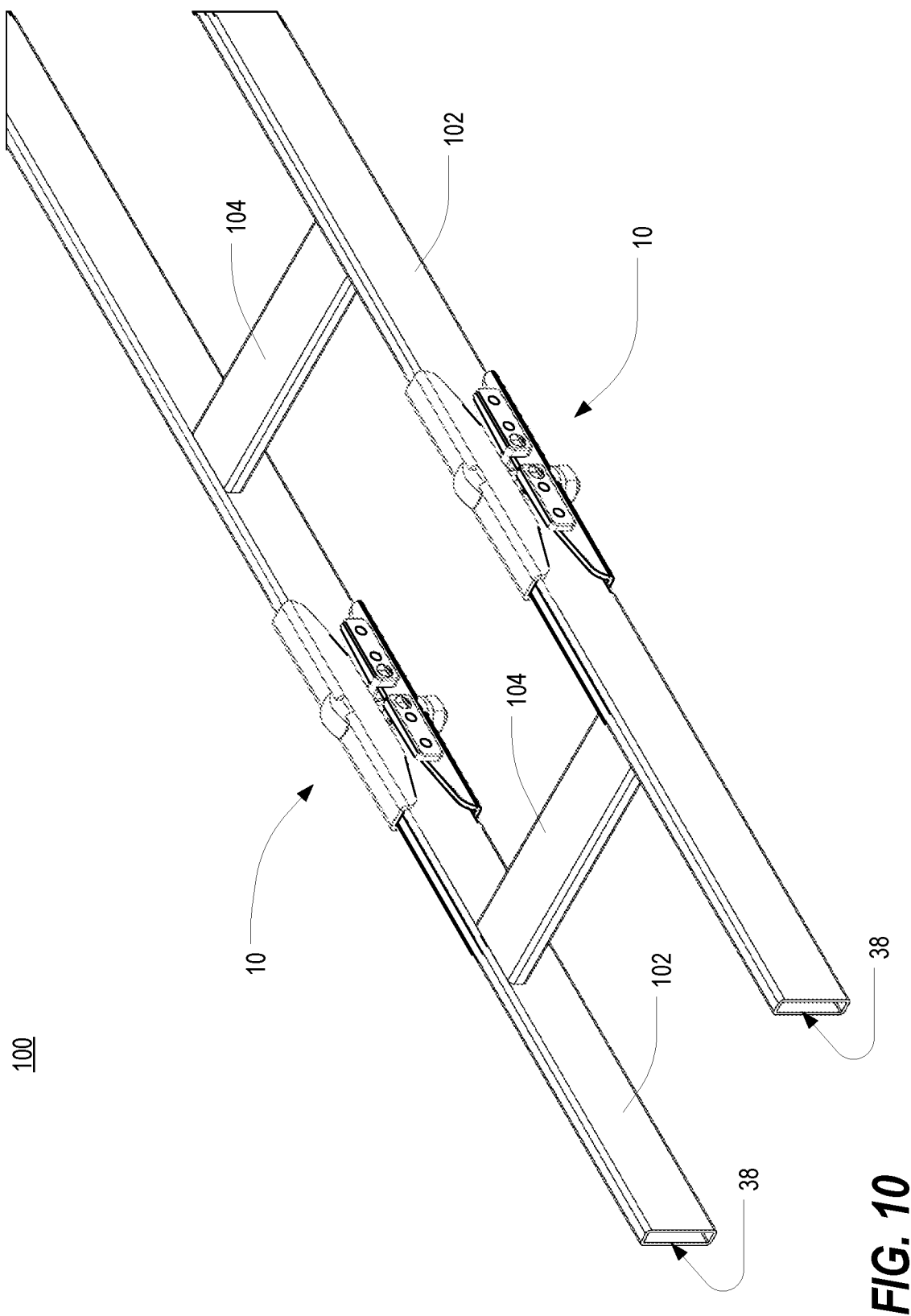
FIG. 10 is an isometric view of an exemplary cable runway system utilizing two bracket assemblies like the one of FIG. 8.

The cable runway rails 102 are part of a cable runway system 100, a simple example of which is shown in FIG. 10, of interconnected rails 102 and crossbeams 104 that define a grid for supporting cables and wiring (not shown) in a telecommunications ecosystem. In various contemplated embodiments, each cable runway rail 102 is a steel member having a hollow interior 38 and a generally rectangular cross-sectional shape. It is further contemplated that other shapes, configurations, and electrically-conductive materials can be used with respect to the cable runway rails 102. In forming a grid, the rails 102 of two ladder sections are often arranged in a linear end-to-end relationship or in a perpendicular end-to-end relationship, although other relationships and orientations of cable runway rails are also used depending on the demands of the environment. Connectors, such as the cable runway splice kit 14, support and/or retain the ends of adjacent rails 102 in the selected arrangement, and hardware is used to secure the connector so that the rails 102 remain in the selected arrangement.

As perhaps best shown in FIG. 9, each splice bracket 16 has a generally C-shaped cross-sectional shape that includes side flanges 22 extending forward from opposite sides of a rear wall 24. In this regard, each splice bracket 16 defines a channel 26 for receiving ends of a pair of adjacent cable runway rails 102. When arranged with respect to a pair of cable runway rails 102, the splice brackets 16 are positioned such that the channels 26 face one another from opposite sides of the pair of rails 102, as shown in FIG. 9. Ends of the cable runway rails 102 are received within the channels 26, but remain spaced apart from one another. Each splice bracket 16 includes an aperture 28 in the rear wall 24 that accommodates the fastener 18. With the cable runway rails 102 positioned between the splice brackets 16, the fastener 18 is fed through the aperture 28 of one of the splice brackets 16, passes between the rails 102, and then passes through the aperture 28 of the other splice bracket 16. In some contemplated embodiments, the fastener 18 is a bolt with a head 36 and a threaded shaft 30 that receives a washer 32 and fastening nut 34 to clamp the splice brackets 16 together from opposite sides of the pair of cable runway rails 102.

Figure 11:
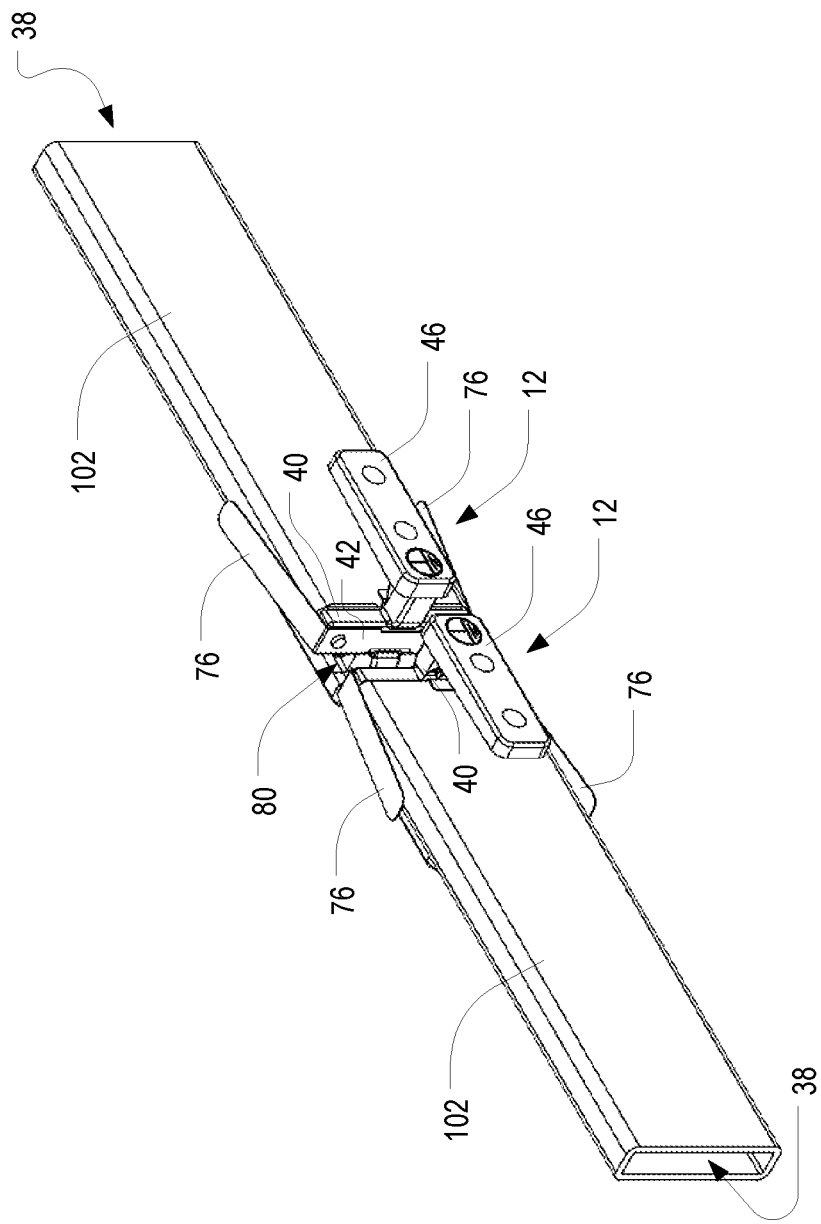
FIG. 11 is an isometric view of a pair of co-linear cable runway rails having bonding endcaps installed in facing ends thereof.

The bracket assembly 10 may be used to electrically bond two cable runways together when the runways are placed end-to-end with their respective rails 102 aligned with one another. In this regard, FIG. 11 is an isometric view of a pair of co-linear cable runway rails 102 having bonding endcaps 12 installed in facing ends thereof. As shown therein, each of the aligned cable runway rails 102 has a bonding endcap 12, seated within an end thereof, that faces the other cable runway rail 102. The side arms 46 and tab structures 42 of each respective bonding endcap 12 extend generally away from those of the other. In some contemplated embodiments, without the cable runway splice kit 14, no part of one of the pair of cable runway rails 102 and its bonding endcap 12 comes into contact with any part of the other of the pair of cable runway rails 102 and its bonding endcap 12, and a gap 80 that exists between the two cable runway rails 102 is large enough to accommodate the fastener 18 of the cable runway splice kit 14.

Referring again to FIG. 9, the splice brackets 16 receive an end portion of each of the pair of cable runway rails 102. As each splice bracket 16 is positioned against the rails 102, the tab portions 76 extending outwardly above and beneath the bonding endcap 12 engage with, and are deflected by, an inner surface of the rear wall 24 of the corresponding splice bracket 16. The fastener 18, which retains and clamps the splice brackets 16 in position at the top and bottom of the cable runway rail 102, as shown in FIG. 8, helps to ensure that the tab portions 76 of the deflectable tab portions remain in contact with, and deflected by, the splice brackets 16. When the cable runway splice kit 14 is installed, the lateral space between the side arms 46 of the bonding lug 40 is sufficient to accommodate the thickness of the splice brackets 16. In this regard, with the cable runway splice kit 14 installed, a side arm 46 is arranged at each side of the cable runway rail 102 (as can be seen in FIG. 8).

An electrical bonding connection is established through one or both of the splice brackets 16 from one of the bonding endcaps 12 to the other. In this way, the equipotential plane can be shared throughout a cable runway. In particular, it is contemplated that an equipotential plane can be shared from a cable runway rail 102 to the spring clip 50 of the bonding endcap 12, from the spring clip 50 to the bonding lug 40 of the bonding endcap 12, from the bonding lug 40 to the deflectable tab structure 42 of the bonding endcap 12, and from the deflectable tab structure 42 to the splice brackets 16 of the cable runway splice kit 14. From the splice brackets 16, the electrical current can follow the same pathway in reverse through the opposite bonding endcap 12 to the adjacent cable runway rail 102. Such connections may be used throughout the cable runway system 100 using additional bracket assemblies 10.

Figure 12:
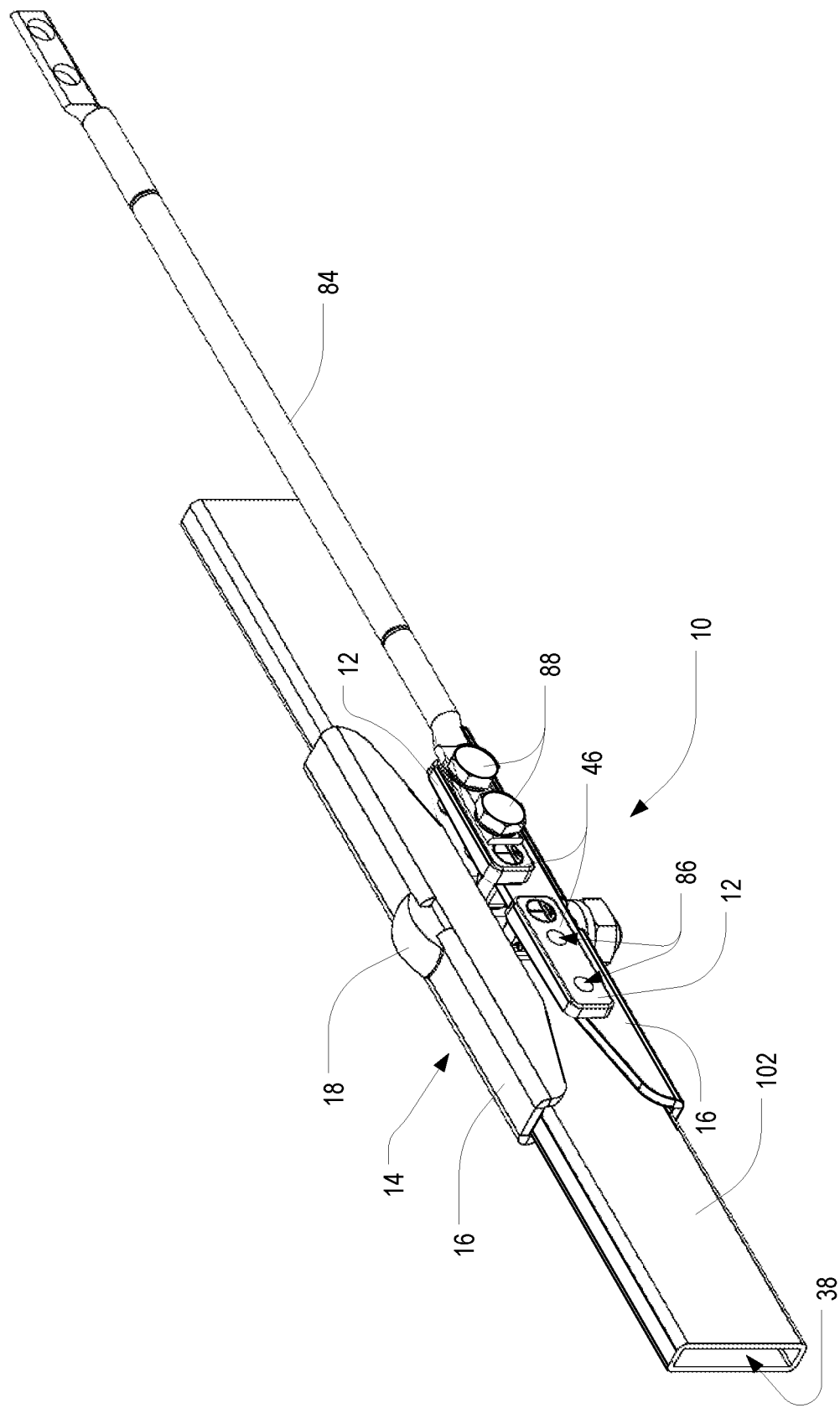
FIG. 12 is an isometric view of the bracket assembly and pair of cable runway rails of FIG. 8, shown with an external bonding device attached to the bracket assembly.

Further electrical bonding may be achieved using the side arms 46 of the bonding lugs 40. In this regard, FIG. 12 is an isometric view of the bracket assembly 10 and pair of cable runway rails 102 of FIG. 8, shown with an external bonding device 84 attached to the bracket assembly 10. In some contemplated embodiments, a need may arise to bond an external bonding device 84 into the equipotential plane of the cable runway. In such cases, it is contemplated that an electrically-conductive external bonding device 84, such as a cable with cable connectors as illustrated, may be physically attached to the bonding lug 40 at one of the side arms 46. In this regard, each side arm 46 of the bonding lug 40 includes one or more apertures 86 for accommodating a separate fastener 88 therethrough for securing the external bonding device 84. An equipotential plane at the bonding lug 40 can be shared with the external bonding device 84 either through direct contact therewith (i.e., by the external bonding device 84 being secured against one of the side arms 46) or through use of an electrically-conductive fastener 88 connecting the external bonding device 84 to the side arm 46. It is contemplated that, if desired, a different external bonding device 84 can be secured to each side arm 46 of a single bonding endcap 12 to electrically bond both devices 84 within the equipotential plane. It is further contemplated that external bonding devices may include one or more applications for low voltage infrastructure, including, but not limited to, relay racks, equipment cabinets, and the like. Further still, because each bonding endcap 12 includes a pair of side arm 46, a high number of available connection points can exist within a cable runway system, even in areas that might otherwise be difficult to access. It is therefore not necessary to drill or otherwise provide additional apertures to facilitate attachment. In this regard, tapped holes through the side arms 46 of the bonding lugs 40 facilitate a range of additional options to connect and provide bonding to other equipment racks, cabinets, or other bonding brackets.

Figure 13:
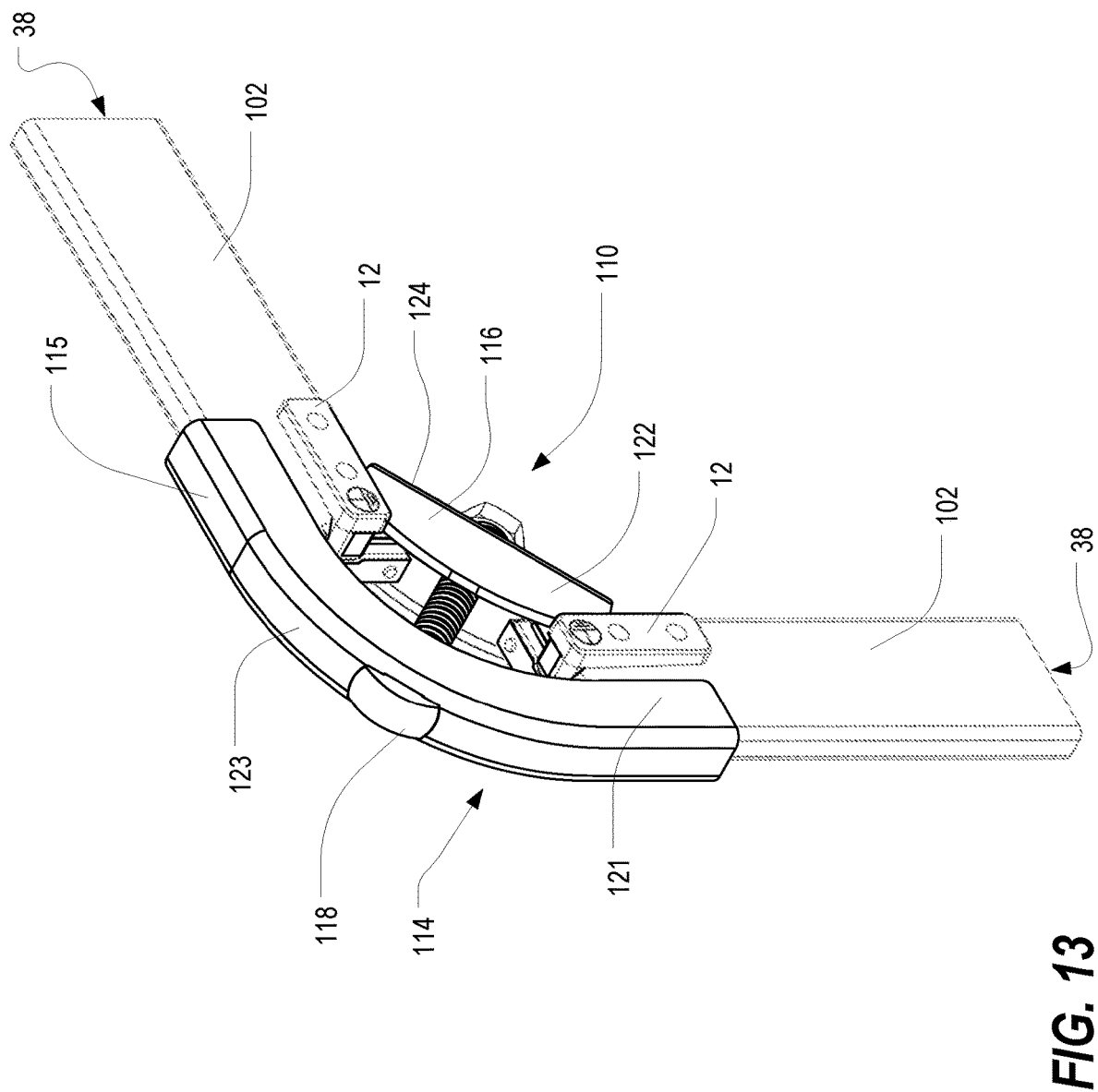
FIG. 13 is an isometric view of another bracket assembly for establishing an electrical bonding connection in accordance with one or more preferred embodiments of the present invention, shown installed with respect to a pair of cable runway rails arranged in a perpendicular relationship.
Figure 14:
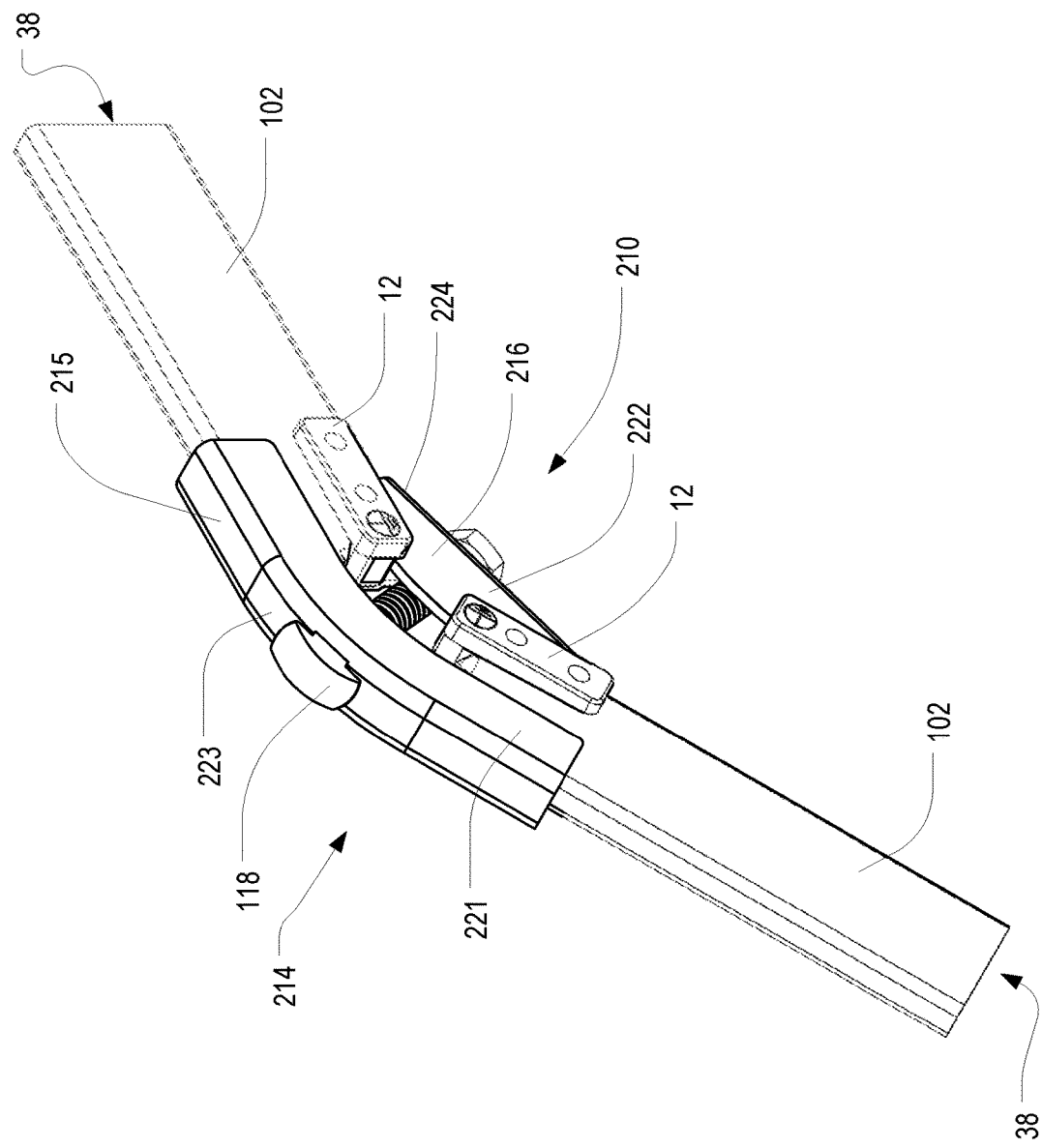
FIG. 14 is an isometric view of still another bracket assembly for establishing an electrical bonding connection in accordance with one or more preferred embodiments of the present invention, shown installed with respect to a pair of cable runway rails arranged in an angled, non-perpendicular relationship.

Although the bracket assemblies 10 described and illustrated thus far may be particularly well suited for bonding cable runway rails 102 that are co-linear with one another, it will be appreciated that similar functionality may be provided in other form factors. For example, FIG. 13 is an isometric view of another bracket assembly 110 for establishing an electrical bonding connection in accordance with one or more preferred embodiments of the present invention, shown installed with respect to a pair of cable runway rails 102 arranged in a perpendicular relationship. Similarly, FIG. 14 is an isometric view of still another bracket assembly 210 for establishing an electrical bonding connection in accordance with one or more preferred embodiments of the present invention, shown installed with respect to a pair of cable runway rails 102 arranged in an angled, non-perpendicular relationship. The bracket assemblies 110, 210 of FIGS. 13 and 14 are capable of utilizing bonding endcaps 12 that are the same as that of FIG. 2. However, to accommodate the angled orientation of the one cable runway rail 102 to the other (instead of the co-linear orientation of the cable runway rails of FIG. 8), a different cable runway splice kit 114, 214 is installed. With reference to FIG. 13, the cable runway splice kit 114 includes a pair of splice brackets 115, 116 and a fastener 118 for securing the splice brackets 115, 116 together from opposite sides of the pair of cable runway rails 102, but at least the outer splice bracket 115 of the splice kit 114 is curved to accommodate the perpendicular orientation of the cable runway rails 102. With reference to FIG. 14, the cable runway splice kit 214 includes a pair of splice brackets 215, 216 and a fastener 118 for securing the splice brackets 215, 216 together from opposite sides of the pair of cable runway rails 102, but at least the outer splice bracket 215 of the splice kit 214 is angled to accommodate the angled orientation of the cable runway rails 102. Otherwise, the splice brackets 115, 116, 215, 216 are similar in many ways to the splice bracket 10 of FIG. 8.

With reference to FIG. 13, each splice bracket 115, 116 has a generally C-shaped cross-sectional shape formed by side flanges 121, 122 that extend forward from opposite sides of a rear wall 123, 124. An aperture in the rear wall 123, 124 of each splice bracket 115, 116 can accommodate the fastener 118 from opposite sides of the cable runway rails 102 for securing and retaining the splice brackets 115, 116. With reference to FIG. 14, each splice bracket 215, 216 has a generally C-shaped cross-sectional shape formed by side flanges 221, 222 that extend forward from opposite sides of a rear wall 223, 224. An aperture in the rear wall 223, 224 of each splice bracket 215, 216 can accommodate the fastener 118 from opposite sides of the cable runway rails 102 for securing and retaining the splice brackets 215, 216. As described previously, and with reference to each of FIGS. 13 and 14, the bonding endcaps 12 seated at adjacent ends of the cable runway rails 102 include deflectable tab structures 42 having tab portions 76 that engage with, and are deflected by, the rear walls 123, 124, 223, 224 of the splice brackets 115, 116, 215, 216. In this regard, an electrical bonding connection can be established from one of the bonding endcaps 12, through one or both of the splice brackets 115, 116, 215, 216, and to the other bonding endcap 12.

In the embodiment of FIG. 13, the outer splice bracket 115 is curved and the inner splice bracket 116 is generally straight. However, it will be appreciated that the outer splice bracket 115 may adopt other shapes. For example, a different radius of curvature may be utilized and/or other variations may be utilized. Furthermore, as in the embodiment of FIG. 14, the splice bracket 215 may utilize two straight segments that meet at an angle. Similarly, although the short inner splice bracket 116, 216 of the embodiments of FIGS. 13 and 14 is generally straight in the illustrated embodiments, it may utilize a curved shape, a plurality of straight segments meeting an angle, or the like. It is contemplated that a bracket assembly in accordance with the present invention can be manufactured in various different bi-directional angles and configurations to accommodate any existing or designed cable runway bonding configuration, with the orientation of one end relative to the other defining the angle between the adjacent cable runway rails 102. In this regard, it is contemplated that a bracket assembly can be implemented in bonding configurations that include, but are not limited to, butt, junction, adjustable junction, 45 degree angle, 90 degree angle, and swivel configurations. It is contemplated in at least some embodiments that the bonding endcap utilized across various configurations of the bracket assembly can be structurally identical.

Further in this regard, it is contemplated that a bonding endcap in accordance with the present invention can be forwards or backwards compatible with existing cable runway splice kits. Field modification of an existing cable runway is thus not required to utilize a bonding endcap in accordance with the present invention. Further still, because an electrical connection is established via contact between the bonding endcap and the cable runway rail at an interior of the rail, there may not exist any need to remove a powder coat finish or paint covering that is commonly applied to an exterior of the rails (but generally not the interior). Nor is there a need to drill or otherwise modify the cable runway rails. In this manner, a bracket assembly (and bonding endcap) in accordance with the present invention can be utilized to integrate an entire telecommunication bonding ecosystem so that equipment racks and cabinets are bonded to the same equipotential plane.

Figure 15A:
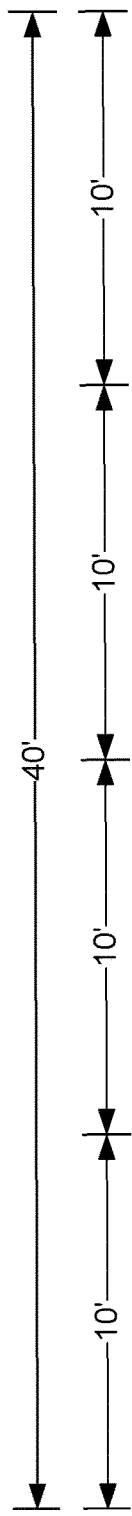
FIG. 15A is a top view of a horizontal cable runway system in accordance with one or more preferred embodiments of the present invention.
Figure 15B:
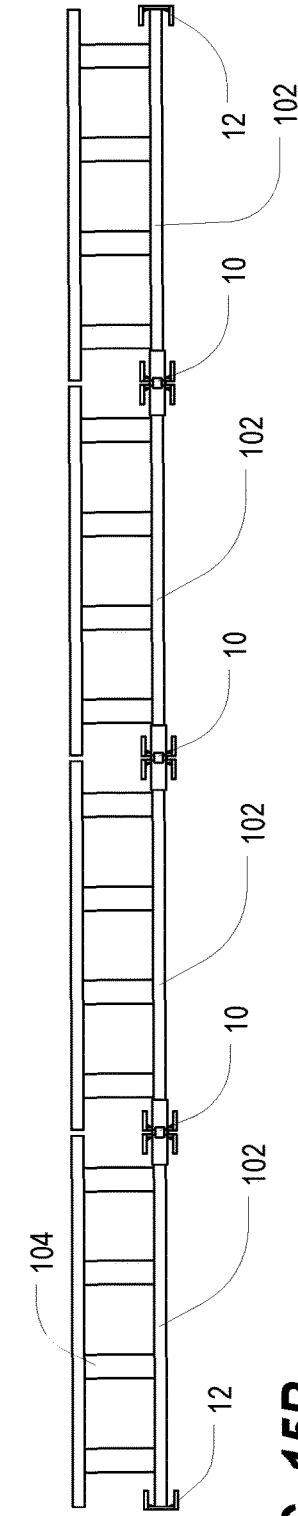
FIG. 15B is a top schematic view of the horizontal cable runway system of FIG. 15A.

The endcap 12 and various splice kits of the present invention may be used to electrically bond components of a cable runway system together. FIG. 15A is a top view of a horizontal cable runway system 100 in accordance with one or more preferred embodiments of the present invention, and FIG. 15B is a top schematic view of the horizontal cable runway system 100 of FIG. 15A. As shown therein, four sections of cable runway, each including a pair of cable runway rails 102 connected by a plurality of crossbeams 104, are aligned end-to-end. Each section is approximately 10 feet long, and thus the entire cable runway system 100 is approximately 40 feet long. Notably, the system 100 of FIGS. 15A and 15B is merely exemplary, and it will be appreciated that an infinite variety of cable runway components of different lengths, shapes, orientations, and the like may be combined in any particular system.

The cable runway rails 102 along one side of the cable runway system 100 are connected together via splice kits 14. A bonding endcap 12 is installed in the left end of the leftmost rail 102, and another endcap 12 is installed in the right end of the rightmost rail 102. The bonding endcaps 12 are electrically bonded to the respective ends of the rails 102. Similarly, each splice kit 14 is electrically bonded, via its endcaps 12, to the two rails 102 between which it is installed, and thus each pair of linearly-adjacent rails 102 are electrically bonded. As a result, the endcap 12 that is installed in the left end of the leftmost rail 102 is electrically bonded through the various rails 102 and splice kits 14 to the endcap 12 that is installed in the right end of the rightmost rail 102.

Figure 15C:
FIG. 15C is a simplified circuit diagram corresponding to the horizontal cable runway system of FIGS. 15A and 15B.

Notably, although electrical bonding occurs along the length of the system 100, a voltage drop occurs between the left and right endcaps 12 of FIG. 15B due to the resistance inherent in the splice kits, and to some degree, the resistance inherent in the rails 102. In at least some embodiments, the resistance of each splice kit 14 has been determined to be approximately 4 milliohms, while the resistance of each endcap 12 by itself has been determined to be approximately 2 milliohms. These resistances are shown schematically in FIG. 15C, which is a simplified circuit diagram corresponding to the horizontal cable runway system 100 of FIGS. 15A and 15B. Not counting the relatively small resistance of the rails 102 themselves, the total serial resistance is thus 2 mΩ+4 mΩ+4 mΩ+4 mΩ+2 mΩ=16 mΩ Notably, when components of an IT ecosystem are to be electrically bonded together, the maximum recommended resistance between any two points in the bonded ecosystem is 100 mΩ Thus, the 16 mΩ resistance between a point on the left endcap 12 and a point on the right endcap 12 is well under the recommended maximum, and the two ends of the system 100 of FIGS. 15A and 15B can be considered to be electrically bonded to one another, even though they are 40 feet apart. It will also be apparent that systems 100 of even greater length may be electrically bonded. Still further, it will be appreciated that electronic equipment enclosures (such as shown in FIG. 7) and other equipment may be reliably bonded to a cable runway system 100 by attaching external bonding devices 84 or the like thereto, with resistances inherent therein being well under recommended maximums.

It will still further be appreciated that the overall resistance of a cable runway system 100 may be reduced even further through the use of multiple electrical paths through the structure. In FIGS. 15A and 15B, only a single electrical path is shown: through one rail 102 in each section of runway connected to a corresponding rail 102 in the next section of runway via the illustrated splice kits. When the rails along the opposite side of each section of runway are likewise connected by splice kits, and when connections are made between the rails 102 on one side and the rails 102 on the other side (such as by establishing electrical connections through the crossbeams 104), the overall effective resistance between opposite ends of the system 100 is reduced via the many parallel paths that are established. (The effective resistance may be determined via conventional resistance network analysis and/or by experimentation.) Additional external bonding devices 84 may also be added to further expand the number of electrical paths and provide additional bonding opportunities. The net effect is to bond an entire IT ecosystem through the cable runway system 100, with the cable runway system 100 being easily bonded through the use of the endcaps 12 and splice kits of the present invention.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claim(s) appended hereto and the equivalents thereof.

What is claimed is:

1. A bracket assembly for establishing an equipotential plane in a cable runway, the bracket assembly comprising:
   a cable runway splice kit including at least one splice bracket made from an electrically-conductive material; and
   a pair of bonding endcaps made from an electrically-conductive material, each bonding endcap including a bonding lug, a spring clip, and a deflectable tab structure that protrudes from the bonding lug, wherein each spring clip is positionable within a channel of a corresponding cable runway rail for electrical bonding therewith, and each bonding lug includes a contact portion received within the spring clip for electrical bonding therewith;
   wherein, when the cable runway rails are arranged in an end-to-end relationship, ends of the cable runway rails having the bonding endcaps are receivable within a bracket channel of the at least one splice bracket such that the deflectable tab structure of each bonding endcap is engaged against and is deflected by the at least one splice bracket, thereby establishing an electrical bonding connection between the pair of cable runway rails through the at least one splice bracket and creating a shared equipotential plane.

2. The bracket assembly of claim 1, wherein the end-to-end relationship is a co-linear relationship.

3. The bracket assembly of claim 1, wherein the end-to-end relationship is an angled relationship.

4. The bracket assembly of claim 3, wherein the end-to-end, angled relationship is a perpendicular relationship.

5. The bracket assembly of claim 1, wherein the cable runway splice kit includes a pair of splice brackets positionable at opposite sides of the pair of cable runway rails.

6. The bracket assembly of claim 5, wherein the cable runway splice kit includes a fastener for clamping the splice brackets together from opposite sides of the pair of cable runway rails.

7. The Bracket assembly of claim 1, wherein the bonding endcap at one of the pair of cable runway rails does not directly engage the bonding endcap at the other of the pair of cable runway rails.

8. The bracket assembly of claim 1, wherein each bonding lug includes a side arm extending at each side of the contact portion, the side arms being arranged at external sides of the corresponding cable runway rail when the bonding lug is seated within the spring clip.

9. The bracket assembly of claim 8, wherein each side arm provides an external electrical bonding location for joining an external structure to the shared equipotential plane.

10. The bracket assembly of claim 9, wherein each side arm includes one or more apertures for accommodating a fastener that secures the external structure to one of the side arms.

11. The bracket assembly of claim 1, wherein the spring clip is made from a highly conductive alloy material.

12. The bracket assembly of claim 11, wherein the highly conductive alloy material includes a beryllium copper material.

13. The bracket assembly of claim 1, wherein one or both of the bonding lug and the deflectable tab structure is made from a die cast zinc material.

14. The bracket assembly of claim 1, wherein the spring clip includes two side walls that extend forward from a rear wall and flare apart from one another at distal ends thereof.

15. The bracket assembly of claim 14, wherein each side wall includes one or more contact tabs for engaging and electrically bonding with an interior portion of the channel of the corresponding cable runway rail when the contact portion of the bonding lug is received within the spring clip.

16. The bracket assembly of claim 1, wherein the deflectable tab structure includes a pair of contact portions, each of which protrudes from an opposite side of the bonding lug.

17. A bonding endcap for use in connection with a bracket assembly for establishing an equipotential plane in a cable runway, the bonding endcap comprising:
   a spring clip made from an electrically conductive material and having two side walls that extend forward from a rear wall; and
   a bonding lug made from an electrically conductive material and including a contact portion and a side arm extending at each side of the contact portion;
   wherein the spring clip is positionable within a channel of a cable runway rail; and
   wherein the contact portion of the bonding lug is receivable between the side walls of the spring clip to deflect the side walls and establish an electrical bonding connection from the cable runway rail, through the spring clip, and to the bonding lug.

18. The bonding endcap of claim 17, further comprising a deflectable tab structure made from an electrically conductive material and including at least one contact portion that protrudes from the bonding lug at an angle.

19. The bonding endcap of claim 18, wherein positioning of an end of the cable runway rail having the bonding endcap against a splice bracket causes the at least one contact portion to engage with and be deflected by the splice bracket, thereby sharing the electrical bonding connection with the splice bracket.

20. The bonding endcap of claim 17, wherein each side arm provides an external electrical bonding location for an external structure.

* * * * *